(12) United States Patent
Abe et al.

(10) Patent No.: US 7,633,403 B2
(45) Date of Patent: Dec. 15, 2009

(54) INFORMATION PROCESSING APPARATUS, INFORMATION PROCESSING SYSTEM, AND INFORMATION PROCESSING METHOD

(75) Inventors: Koichi Abe, Yokohama (JP); Hideki Honda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1064 days.

(21) Appl. No.: 11/210,630

(22) Filed: Aug. 24, 2005

(65) Prior Publication Data

US 2006/0050289 A1 Mar. 9, 2006

(30) Foreign Application Priority Data

Aug. 27, 2004 (JP) .............. 2004-249039

(51) Int. Cl.
*G08B 3/00* (2006.01)
(52) U.S. Cl. ............ 340/691.6; 340/691.1; 358/1.15
(58) Field of Classification Search .............. 340/691.1, 340/691.3, 691.6, 691.8, 286.01, 286.02; 707/E17.117; 358/1.15, 1.6; 717/108, 112; 704/E15.045; 714/48
See application file for complete search history.

(56) References Cited

U.S. PATENT DOCUMENTS

| | | | |
|---|---|---|---|
| 6,587,971 B1 * | 7/2003 | Kai | 714/48 |
| 7,120,897 B2 * | 10/2006 | Ebbo et al. | 717/108 |
| 7,370,008 B1 * | 5/2008 | Hill | 705/27 |
| 2003/0139932 A1 * | 7/2003 | Shao et al. | 704/275 |
| 2004/0190015 A1 * | 9/2004 | Uchida | 358/1.6 |
| 2005/0022120 A1 * | 1/2005 | Takahashi | 715/522 |
| 2005/0134910 A1 * | 6/2005 | Kim et al. | 358/1.15 |

FOREIGN PATENT DOCUMENTS

JP 09-152946 6/1997

\* cited by examiner

*Primary Examiner*—Van T. Trieu
(74) *Attorney, Agent, or Firm*—Canon USA Inc IP Div

(57) ABSTRACT

An information processing apparatus that is connectable to an external device via a communication network and that supplies information concerning the external device, the information being displayable in accordance with a plurality of expressions. The information processing apparatus includes an acquiring unit configured to acquire information concerning a display program, the information being used for identifying an expression to be displayed in the display program; a receiving unit configured to receive the information concerning the external device from the external device; and a generating unit configured to identify the expression of the information concerning the external device, received by the receiving unit, based on the information concerning the display program, acquired by the acquiring unit, to generate display information complying with the identified expression.

17 Claims, 31 Drawing Sheets

Printing and Print Spooler Interfaces

⟷ REPRESENTS BOTH ADDRESS BUS AND DATA BUS

C:¥WINDOWS¥system32¥spool¥drivers¥w32x86¥3¥
JP¥LM_RES.DLL
US¥LM_RES.DLL
⋯
¥LM_RES.DLL

FIG. 11

| | |
|---|---|
| Definition: | InkInfo |
| Node Type: | Property |
| Description: | Information concerning ink |
| Full Schema Path: | ¥Printer.InkInfo |

| | | |
|---|---|---|
| Definition: | [Color] | |
| Node Type: | Property | |
| Description: | Information concerning color | |
| Full Schema Path: | ¥Printer.InkInfo.[Color] | |
| Allowed Values: | Black | // Black |
| | Cyan | // Cyan |
| | Magenta | // Magenta |
| | Yellow | // Yellow |

| | | |
|---|---|---|
| Definition: | Installed | |
| Node Type: | Value | |
| Data Type: | Boolean | |
| Description: | [Color] ink is loaded or not? | |
| Full Schema Path: | ¥Printer.InkInfo.[Color]:Installed | |
| Allowed Values: | True | // Loaded |
| | False | // Not loaded |

| | | |
|---|---|---|
| Definition: | State | |
| Node Type: | Value | |
| Data Type: | String | |
| Description: | State of the remaining amount of [Color] ink | |
| Full Schema Path: | ¥Printer.InkInfo.[Color]:State | |
| Allowed Values: | Full | // Full |
| | Low | // Low |
| | Out | // Out |
| | Unknown | // Unknown |

| | | |
|---|---|---|
| Definition: | ModelName | |
| Node Type: | Value | |
| Data Type: | String | |
| Description: | Type name of [Color] ink | |
| Full Schema Path: | ¥Printer.InkInfo.[Color]:ModelName | |
| Examples: | CI-B | // BLACK INK |
| | CI-C | // CYAN INK |
| | CI-M | // MAGENTA INK |
| | CI-Y | // YELLOW INK |

FIG. 14

| | |
|---|---|
| Definition: | InkInfo |
| Node Type: | Property |
| Description: | Information concerning ink |
| Full Schema Path: | ¥Printer.InkInfo |

| | | |
|---|---|---|
| Definition: | [Color] | |
| Node Type: | Property | |
| Description: | Information concerning color | |
| Full Schema Path: | ¥Printer.InkInfo.[Color] | |
| Allowed Values: | Black | // Black |
| | Cyan | // Cyan |
| | Magenta | // Magenta |
| | Yellow | // Yellow |

| | | |
|---|---|---|
| Definition: | Installed | |
| Node Type: | Value | |
| Data Type: | Boolean | |
| Description: | [Color] ink is loaded or not? | |
| Full Schema Path: | ¥Printer.InkInfo.[Color]:Installed | |
| Allowed Values: | True | // Loaded |
| | False | // Not loaded |

| | | |
|---|---|---|
| Definition: | State | |
| Node Type: | Value | |
| Data Type: | String | |
| Description: | State of the remaining amount of [Color] ink | |
| Full Schema Path: | ¥Printer.InkInfo.[Color]:State | |
| Allowed Values: | Full | // Full |
| | Low | // Low |
| | Out | // Out |
| | Unknown | // Unknown |

FIG. 15

| | |
|---|---|
| Definition: | DisplayName |
| Node Type: | Property |
| Description: | Name of [Color] ink localized into a certain language |
| Full Schema Path: | ¥Printer.InkInfo.[Color].DisplayName |

| | |
|---|---|
| Definition: | Language |
| Node Type: | Property |
| Description: | Language ID |
| Full Schema Path: | ¥Printer.InkInfo.[Color].DisplayName.[Language] |
| Allowed Language: | Character string (char*) resulting from conversion of language ID (unsigned short type) acquired with GetUserDefaultLangID()API function or the like |

[EXAMPLE] 1033　　// US English
　　　　　　1041　　// Japanese
Auto　　// Automatic selection of appropriate language

| | |
|---|---|
| Definition: | Name |
| Node Type: | Value |
| Data Type: | Unicode string |
| Description: | Name of [Color] ink localized into a certain language |
| Full Schema Path: | ¥Printer.InkInfo.[Color].DisplayName:Name |
| Examples: | CI-B Black Ink　　// US English |
| | CI-B 黒インク　　// Japanese |
| | CI-C Cyan Ink　　// US English |
| | CI-C シアンインク　　// Japanese |
| | CI-M Magenta Ink　　// US English |
| | CI-M マゼンタインク　　// Japanese |
| | CI-Y Yellow Ink　　// US English |
| | CI-Y 黄インク　　// Japanese |

FIG. 16

```
<Enumeration>
- Query (Schema) -
¥PrinterInkInfo
```

| - Retrieve (Schema) - | - Retrieve (Value) - |
|---|---|
| ¥Printer.InkInfo.Black:Installed | True |
| ¥Printer.InkInfo.Black:State | Full |
| ¥Printer.InkInfo.Black.DisplayName.1033:Name | CI-B Black Ink |
| ¥Printer.InkInfo.Black.DisplayName.1041:Name | CI-B 黒 インク |
| ¥Printer.InkInfo.Cyan:Installed | True |
| ¥Printer.InkInfo.Cyan:State | Low |
| ¥Printer.InkInfo.Cyan.DisplayName.1033:Name | CI-C Cyan Ink |
| ¥Printer.InkInfo.Cyan.DisplayName.1041:Name | CI-C シアン インク |
| ¥Printer.InkInfo.Magenta:Installed | True |
| ¥Printer.InkInfo.Magenta:State | Out |
| ¥Printer.InkInfo.Magenta.DisplayName.1033:Name | CI-M Magenta Ink |
| ¥Printer.InkInfo.Magenta.DisplayName.1041:Name | CI-M マゼンタ インク |
| ¥Printer.InkInfo.Yellow:Installed | True |
| ¥Printer.InkInfo.Yellow:State | Full |
| ¥Printer.InkInfo.Yellow.DisplayName.1033:Name | CI-Y Yellow Ink |
| ¥Printer.InkInfo.Yellow.DisplayName.1041:Name | CI-Y 黄 インク |

FIG. 17

```
<Get>
- Query (Schema) -            - Retrieve (Schema) -              - Retrieve (Value) -
¥Printer.InkInfo.Black.DisplayName.1033:Name                     CI-B Black Ink
¥Printer.InkInfo.Cyan.DisplayName.1033:Name                      CI-C Cyan Ink
¥Printer.InkInfo.Magenta.DisplayName.1033:Name                   CI-M Magenta Ink
¥Printer.InkInfo.Yellow.DisplayName.1033:Name                    CI-Y Yellow Ink ¥Printer.InkInfo.Black.DisplayName.1041:Name                     CI-B 黒インク
¥Printer.InkInfo.Cyan.DisplayName.1041:Name                      CI-C シアン インク
¥Printer.InkInfo.Magenta.DisplayName.1041:Name                   CI-M マゼンタ インク
¥Printer.InkInfo.Yellow.DisplayName.1041:Name                    CI-Y 黄インク

¥Printer.InkInfo.Black.DisplayName_Auto:Name                     CI-B Black Ink
¥Printer.InkInfo.Cyan.DisplayName_Auto:Name                      CI-C Cyan Ink
¥Printer.InkInfo.Magenta.DisplayName_Auto:Name                   CI-M Magenta Ink
¥Printer.InkInfo.Yellow.DisplayName_Auto:Name                    CI-Y Yellow Ink
```

```
HMODULE
LoadLibraryForMultiLanguage(
    LPCTSTR      lpFileName,
    LANGID       languageId
);
```

Printing and Print Spooler Interfaces

FIG. 20

```
1:  <?xml version="1.0" ?>
2:  <root xmlns="urn:schemas-upnp-org:device-1-0">
3:    <specVersion>
4:      <major>1</major>
5:      <minor>0</minor>
6:    </specVersion>
7:    <device>
8:      <deviceType>urn:schemas-upnp-org:device:Basic:1</deviceType>
9:      <friendlyName>KoichiPC</friendlyName>
10:     <manufacturer>ABC</manufacturer>
11:     <manufacturerURL>http://abc.jp</manufacturerURL>
12:     <modelDescription>ABC Mdl-K</modelDescription>
13:     <modelName>Mdl-K</modelName>
14:     <serialNumber>000888</serialNumber>
15:     <languageID>1033</languageID>
16:   </device>
17: </root>
```

FIG. 21A

Resource File for Application (APP_RES.DLL (US English, LANGID = 1033))

| ID | CHARACTER STRING |
|---|---|
| ID1 | CI-B Black |
| ID2 | CI-C Cyan |
| ID3 | CI-M Magenta |
| ID4 | CI-Y Yellow |

FIG. 21B

Resource File for Application (APP_RES.DLL (Japanese, LANGID = 1041))

| ID | CHARACTER STRING |
|---|---|
| ID1 | CI-B 黒 |
| ID2 | CI-C シアン |
| ID3 | CI-M マゼンタ |
| ID4 | CI-Y 黄 |

FIG. 22A

Resource File for LM (LM_RES.DLL (US English, LANGID = 1033))

| ID | CHARACTER STRING |
|---|---|
| ID1 | CI-B Black Ink |
| ID2 | CI-C Cyan Ink |
| ID3 | CI-M Magenta Ink |
| ID4 | CI-Y Yellow Ink |

FIG. 22B

Resource File for LM (LM_RES.DLL (Japanese, LANGID = 1041))

| ID | CHARACTER STRING |
|---|---|
| ID1 | CI-B 黒 インク |
| ID2 | CI-C シアン インク |
| ID3 | CI-M マゼンタ インク |
| ID4 | CI-Y 黄 インク |

FIG. 23

- Request command issued from PC -
Ink:

- Ink information returned from printer -
Ink:Black.CI-B.Full,Cyan.CI-C.Low,Magenta.CI-M.Out,Yellow.CI-Y.Full;

FIG. 24

- Request command issued from PC -
Ink:

- Ink information returned from printer -
Ink:Black.CI-B,JP"CI-B 黒 インク"US"CI-B Black Ink".Full,
Cyan.CI-C,JP"CI-C シアン インク"US"CI-C Cyan Ink".Low,
Magenta.CI-M,JP"CI-M マゼンタ インク"US"CI-M Magenta Ink".Out,
Yellow.CI-Y,JP"CI-Y 黄 インク"US"CI-Y Yellow Ink".Full;

Printing and Print Spooler Interfaces

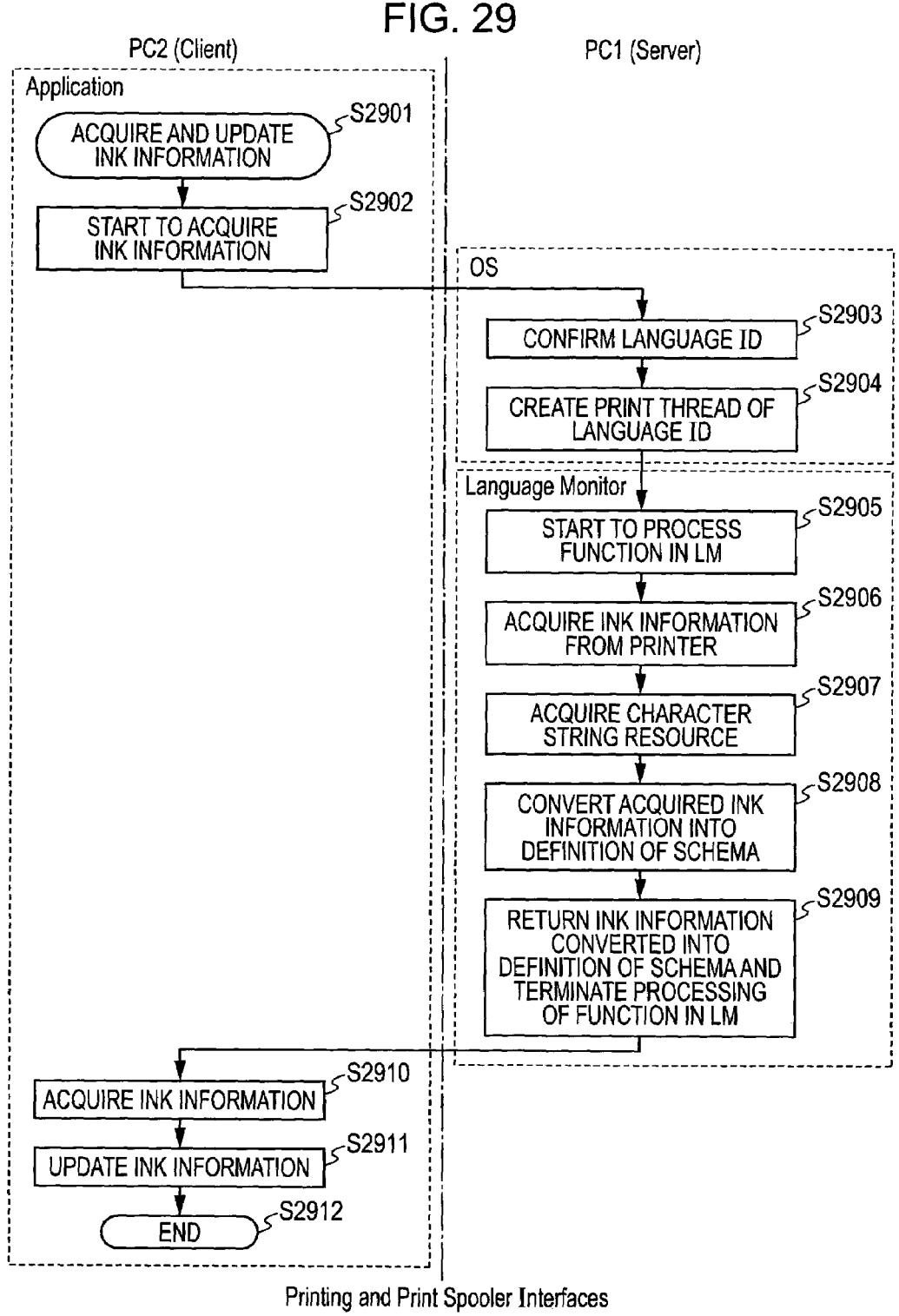

FIG. 30

```c
HMODULE  hmRes;
LANGID   lid;
LPTSTR   lpBuffer = NULL;
int      iBufSize;

// Confirm language ID (S2508 in Fig. 25)
lid = GetUserDefaultLangID();

// Load application resource 8 (S2509 in Fig. 25)
if(lid == 1041){
    hmRes = LoadLibrary("C:\Program Files\MMN\Status Monitor\Res\JP\APP_RES.DLL");
}
else if(lid == 1033){
    hmRes = LoadLibrary("C:\Program Files\MMN\Status Monitor\Res\US\APP_RES.DLL");
}
    ...
else if(lid == ...){
    hmRes = LoadLibrary("C:\Program Files\MMN\Status Monitor\Res\..\APP_RES.DLL");
}

// Acquire string resource (S2509 in Fig. 25)
iBufSize = LoadString((HINSTANCE)hmRes, ID1, lpBuffer, 0) + 1;
lpBuffer = (LPTSTR)malloc(sizeof(TCHAR) * iBufSize);
LoadString((HINSTANCE)hmRes, ID1, lpBuffer, iBufSize);
```

FIG. 31

```
HMODULE hmRes;
LANGID   lid;
LPTSTR   lpBuffer = NULL;
int      iBufSize;

// Confirm language ID (S2605 in Fig. 26)
After confirming language ID specified as argument of SendRecvBidiDataFromPort() function and
converting it into LANGID (unsigned short type), substitute the converted language ID in lid.

// Load LM resource 6 (S2608 in Fig. 26)
if (lid == 1041){
    hmRes = LoadLibrary("C:\WINDOWS\system32\spool\drivers\w32x86\3\JP\LM_RES.DLL");
}
else if(lid == 1033){
    hmRes = LoadLibrary("C:\WINDOWS\system32\spool\drivers\w32x86\3\US\LM_RES.DLL");
}
  ...
else if(lid == …){
    hmRes = LoadLibrary("C:\WINDOWS\system32\spool\drivers\w32x86\3\…\LM_RES.DLL");
}

// Acquire string resource (S2608 in Fig. 26)
iBufSize = LoadString((HINSTANCE)hmRes, ID1, lpBuffer, 0) + 1;
lpBuffer = (LPTSTR)malloc(sizeof(TCHAR) * iBufSize);
LoadString((HINSTANCE)hmRes, ID1, lpBuffer, iBufSize);
```

FIG. 32

```
HMODULE hmRes;
LANGID   lid;
LPTSTR   lpBuffer = NULL;
int      iBufSize;

// Confirm language ID (S2605 in Fig. 26)
After confirming language ID specified as argument of SendRecvBidiDataFromPort() function and
converting it into LANGID (unsigned short type), substitute the converted language ID in lid.

// Load LM resource 6 (S2608 in Fig. 26)
hmRes = LoadLibraryForMultiLanguage("LM_RES.DLL", lid);

// Acquire string resource (S2608 in Fig. 26)
iBufSize = LoadString((HINSTANCE)hmRes, ID1, lpBuffer, 0) + 1;
lpBuffer = (LPTSTR)malloc(sizeof(TCHAR) * iBufSize);
LoadString((HINSTANCE)hmRes, ID1, lpBuffer, iBufSize);
```

```
HMODULE  hmRes;
LANGID   lid;
LPTSTR   lpBuffer = NULL;
int      iBufSize;

// Load LM resource 6 (S2907 in Fig. 29)
hmRes = LoadLibrary("LM_RES.DLL");

// Acquire string resource (S2907 in Fig. 29)
iBufSize = LoadString((HINSTANCE)hmRes, ID1, lpBuffer, 0) + 1;
lpBuffer = (LPTSTR)malloc(sizeof(TCHAR) * iBufSize);
LoadString((HINSTANCE)hmRes, ID1, lpBuffer, iBufSize);
```

```
Definition:        InkInfo
Node Type:         Property
Description:       Information concerning ink
Full Schema Path:  ¥Printer.InkInfo Definition:        [Color]
Node Type:         Property
Description:       Information concerning color
Full Schema Path:  ¥Printer.InkInfo.[Color]
Allowed Values:    Black            // Black
                   Cyan             // Cyan
                   Magenta          // Magenta
                   Yellow           // Yellow Definition:        Installed
Node Type:         Value
Data Type:         Boolean
Description:       [Color] ink is loaded or not?
Full Schema Path:  ¥Printer.InkInfo.[Color]:Installed
Allowed Values:    True             // Loaded
                   False            // Not loaded Definition:        State
Node Type:         Value
Data Type:         String
Description:       State of the remaining amount of [Color] ink
Full Schema Path:  ¥Printer.InkInfo.[Color]:State
Allowed Values:    Full             // Full
                   Low              // Low
                   Out              // Out
                   Unknown          // Unknown Definition:        DisplayName
Node Type:         Value
Data Type:         Unicode string
Description:       Name of [Color] ink localized into a certain language
Full Schema Path:  ¥Printer.InkInfo.[Color]:DisplayName
Examples:          CI-B Black Ink          // US English
                   CI-B 黒 インク           // Japanese
                   CI-C Cyan Ink           // US English
                   CI-C シアン インク        // Japanese
                   CI-M Magenta Ink        // US English
                   CI-M マゼンタ インク      // Japanese
                   CI-Y Yellow Ink         // US English
                   CI-Y 黄 インク           // Japanese
```

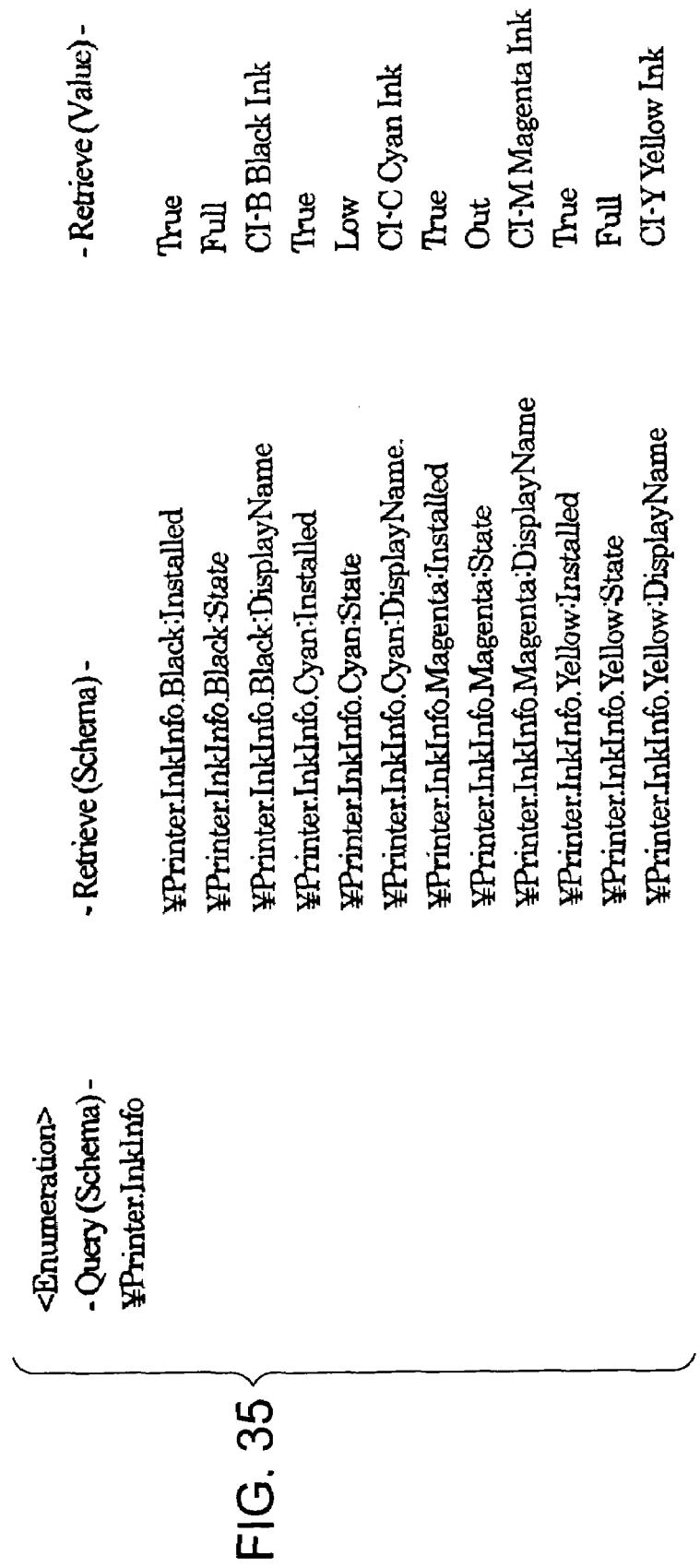

```
<Enumeration>
- Query (Schema) -
¥Printer.InkInfo

- Retrieve (Schema) -                              - Retrieve (Value) -
¥Printer.InkInfo.Black:Installed                   True
¥Printer.InkInfo.Black:State                       Full
¥Printer.InkInfo.Black:DisplayName                 CI-B Black Ink
¥Printer.InkInfo.Cyan:Installed                    True
¥Printer.InkInfo.Cyan:State                        Low
¥Printer.InkInfo.Cyan:DisplayName                  CI-C Cyan Ink
¥Printer.InkInfo.Magenta:Installed                 True
¥Printer.InkInfo.Magenta:State                     Out
¥Printer.InkInfo.Magenta:DisplayName               CI-M Magenta Ink
¥Printer.InkInfo.Yellow:Installed                  True
¥Printer.InkInfo.Yellow:State                      Full
¥Printer.InkInfo.Yellow:DisplayName                CI-Y Yellow Ink
```

FIG. 35

INFORMATION PROCESSING APPARATUS, INFORMATION PROCESSING SYSTEM, AND INFORMATION PROCESSING METHOD

BACKGROUND OF THE INVENTION

1. Field of the Invention

The present invention relates to a technology capable of controlling a peripheral device over a network.

2. Description of the Related Art

In recent years, along with development of network infrastructure, network-ready peripheral devices, including inkjet printers, laser beam printers, copiers, facsimiles, scanners, digital cameras, and multifunction information processing apparatuses having the functions of the above devices, have rapidly come into wide use. This is accompanied by distribution (sale) of applications that are used for controlling the peripheral devices and monitoring the states thereof and that are manufactured by third parties, which have no relationship with the manufacturers of the peripheral devices, from the third parties to users.

For example, Japanese Patent Laid-Open No. 09-152946 discloses a system that displays information concerning the ink loaded in a printer, which is a peripheral device, in a display program (a driver program providing a user interface or a status monitor) in an information processing apparatus connected to the printer through a network in real time. In the implementation of Universal Plug and Play or Web Service, mechanisms in which display programs or drivers transmit and/or receive status information (such as the type of ink and errors in peripheral devices) to and/or from language monitors or printers in the form including a predetermined definition of presentation have been provided. For example, with regard to text-base information, both status information and presentation information defining how the status information is displayed have been increasingly transmitted from the language monitors and the printers to status monitors or the like.

However, in the above situations in which statuses are transmitted and/or received by using messages in the form including the predetermined definition of presentation, displaying the received messages in the display programs by using the predetermined definition of presentation can cause problems. For example, on the assumption that an application (a status monitor or a driver providing a user interface) is manufactured by MMN company that is a third party having no relationship with XYZ company, which is the manufacturer of the printer, it is difficult or is not possible for the MMN company to acquire the accurate names of ink for the printer from the XYZ company. Consequently, there are cases in which the names of ink for the printer, defined by the MMN company having no relationship with the XYZ company, which is the manufacturer of the printer, are displayed and the displayed names of ink are different from formal names defined by the XYZ company. In such cases, there is a problem in that users can be confused in the loading or purchasing of the ink.

Furthermore, when the names of ink in English are returned where the language used by the display program is Japanese, the names of ink can be displayed in English despite the fact that the names of ink are desirably displayed in Japanese in the display program. The names of ink are only examples of information processed in the display program and are not limitedly used in inkjet printers, unless otherwise specified. Any displayable status and error information, including the information concerning errors occurring in other peripheral devices, may be displayed in the display program.

SUMMARY OF THE INVENTION

The present invention is directed to an information processing apparatus and a method of control thereof for allowing accurate display of, for example, the names of the ink loaded in a printer by using information adapted to a distributed display program, such as information concerning the language used by the display program or information defined by the manufacturer of the printer, even when the manufacturer of the printer is different from that of the display program.

According to one aspect of the present invention, an information processing apparatus that is connectable to an external device via a communication network and that supplies information concerning the external device, the information concerning the external device being displayable in accordance with a plurality of expressions, includes an acquiring unit configured to acquire information concerning a display program, the information concerning the display program being used for identifying at least one of the plurality of expressions to be displayed in the display program; a receiving unit configured to receive the information concerning the external device from the external device; and a generating unit configured to identify the expression of the information concerning the external device, received by the receiving unit, based on the information concerning the display program, acquired by the acquiring unit, in order to generate display information complying with the identified expression.

According to another aspect of the present invention, an information processing apparatus connectable to an external device via a communication network, includes a receiving unit configured to receive information concerning a display program set in another information processing apparatus from the other information processing apparatus; a thread generating unit configured to generate a thread that is used for controlling the external device and that corresponds to the information concerning the display program based on the information concerning the display program; an acquiring unit configured to acquire information concerning the external device from the external device; a converting unit configured to convert the information concerning the external device, acquired by the acquiring unit, into information appropriate for the display program based on the thread generated by the thread generating unit; and a transmission unit configured to transmit the information concerning the external device, converted by the converting unit, to the other information processing apparatus.

According to yet another aspect of the present invention, a control method for an information processing apparatus that is connectable to an external device via a communication network and that supplies information concerning the external device, the information being displayable in accordance with a plurality of expressions, includes the steps of acquiring information concerning a display program, the information concerning the display program being used for identifying at least one of the plurality of expressions adoptable in the information concerning the external device; receiving the information concerning the external device; and identifying the expression of the information concerning the external device, received in the receiving step, based on the information concerning the display program, acquired in the acquiring step, to generate display information complying with the identified expression.

According to yet still another aspect of the present invention, a control method for an information processing apparatus connectable to an external device via a communication network, includes the steps of receiving information concerning a display program set in another information processing apparatus from the other information processing apparatus; generating a thread that is used for controlling the external device and that corresponds to the information concerning the display program; acquiring information concerning the external device from the external device; converting the information concerning the external device, acquired in the acquiring step, into information appropriate for the display program based on the thread generated in the generating step; and transmitting the information concerning the external device, converted in the converting step, to the other information processing apparatus.

Further features of the present invention will become apparent from the following description of exemplary embodiments with reference to the attached drawings.

BRIEF DESCRIPTION OF THE DRAWINGS

FIG. 11 shows schemas used when an application (status monitor) acquires the information concerning ink and the states of the ink from the printer, according to the third embodiment.

FIG. 14 shows schemas used when the application (status monitor) acquires the information concerning the ink and the states of the ink from the printer, according to the first embodiment.

FIG. 15 shows schemas used when the application (status monitor) acquires the information concerning the ink and the states of the ink from the printer, according to the first embodiment.

FIG. 16 shows schemas and values when the schemas defined in FIGS. 14 and 15 are used to enumerate the information and states of ink, according to the first embodiment.

FIG. 17 shows schemas and values when the schemas defined in FIGS. 14 and 15 are used to get the name of ink, according to the first embodiment.

FIG. 20 shows the content of XML Device Description in a UPnP device supported by the PC.

FIGS. 21A and 21B are tables of IDs and character strings in the application resource, according to the third embodiment.

FIGS. 22A and 22B are tables of IDs and character strings in the LM resource, according to the first embodiment.

FIG. 23 shows data when the PC acquires ink information from the printer, according to the first embodiment.

FIG. 24 shows data when the PC acquires ink information from the printer, according to the second embodiment.

FIG. 29 is a flowchart showing a process in which the application (status monitor) acquires information concerning the ink loaded in the printer 3 to update the display in the ink-information display area in FIG. 8, according to the second embodiment.

FIG. 30 shows a sample program of a series of processes of determining a language ID in the application (status monitor) to acquire the character string resource, according to the third embodiment.

FIG. 31 shows a sample program of a series of processes of determining the language ID in a function "SendRecvBidiDataFromPort( )" exported by an LM to acquire the character string resource, according to the first embodiment.

FIG. 32 shows another sample program of a series of processes of determining the language ID in the "SendRecvBidiDataFromPort( )" function exported by the LM to acquire the character string resource, according to the first embodiment.

FIG. 33 shows a sample program of a series of processes of acquiring the character string resource in the "SendRecvBidiDataFromPort( )" function exported by the LM, according to the second embodiment.

FIG. 34 shows schemas used when the application (status monitor) acquires the information concerning the ink and the states of the ink from the printer, according to the second embodiment.

FIG. 35 shows schemas and values when the schemas defined in FIG. 34 are used to enumerate the information and states of ink, according to the second embodiment.

DESCRIPTION OF THE EMBODIMENTS

Embodiments of the present invention will be described below with reference to the attached drawings.

Since, among functions referred to in the following description, functions having no detailed description are disclosed in the site http://msdn.microsoft.com/library/default.asp of Microsoft Developer Network (MSDN) on the Internet as of Jul. 15, 2004, an excessive description is omitted herein.

In the following description, since USB is an abbreviation of Universal Serial Bus and is a known interface capable of two-way communication, a detailed description is omitted herein. UPnP is an abbreviation of Universal Plug and Play. Since the specification of the UPnP are disclosed in detail in "Universal Plug and Play Device Architecture V1.0" standardized by UPnP Forum, only the part involved in the present invention will be described in the following description and a description of other parts is omitted herein.

First Embodiment

Figure 1:
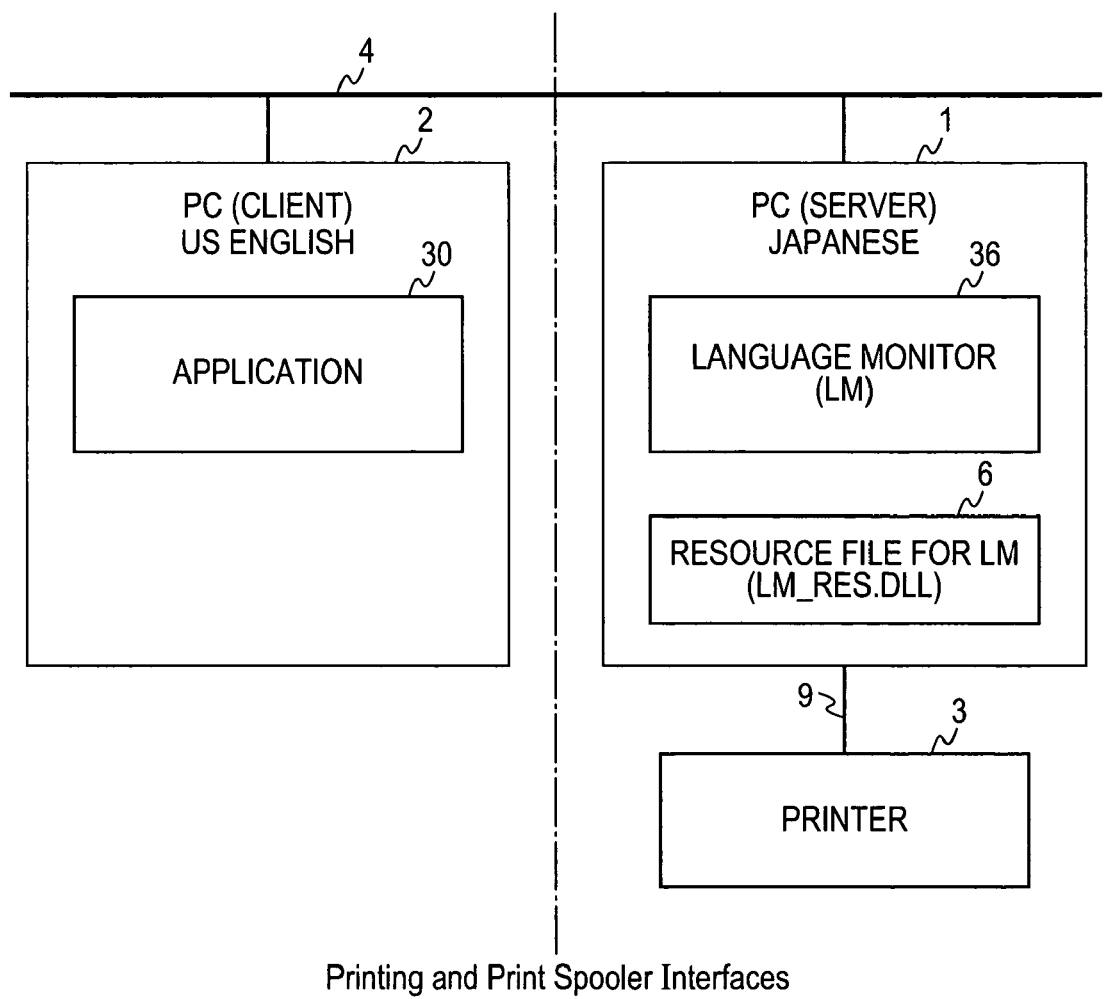
FIG. 1 is a block diagram showing the structure of a peripheral-device control system including an information processing apparatus and a peripheral device, according to a first embodiment of the present invention.

FIG. 1 is a block diagram showing the structure of a peripheral-device control system including an information processing apparatus and a peripheral device, according to a first embodiment of the present invention. Referring to FIG. 1, information processing apparatuses 1 and 2 are common personal computers (each of them being abbreviated as the PC in some cases). The PCs 1 and 2 each have a hardware structure described below with reference to FIG. 3 and each have Windows™ XP of Microsoft U.S. installed as the operating system (OS). The PC 1 is connected to the PC 2 via a network 4, which is Ethernet™, and the PC 1 is capable of two-way communication with the PC 2. A printer 3, which is a color inkjet printer, is a peripheral device in the first embodiment. The printer 3 has a model name kmmn and is manufactured by XYZ company. The peripheral device may be an image forming apparatus, such as a printer, a copier, a facsimile, or a digital multifunction machine having the functions of the above-mentioned devices, a scanner, or a digital camera.

The printer 3 has a hardware structure to be described below with reference to FIG. 4. The printer 3 is connected to the PC 1 via a USB interface 9, and the printer 3 is capable of two-way communication with the PC 1. A language monitor 36 (hereinafter referred to as the LM 36 in some cases), described below with reference to FIG. 5, is a dynamic link library for Windows™. A resource file 6 for the language monitor 36 (hereinafter referred to as the LM resource 6 in some cases) is a dynamic link library for Windows™ and stores character string resources and so on. An application 30, which is an example of a display program, includes executable files (*.exe) for Windows™. The application 30 is exemplified by a status monitor described below with reference to FIG. 8. The display program may be part of a device driver program providing a user interface.

The application (status monitor) 30 is manufactured by MMN company. In the peripheral-device control system according to the first embodiment, the PC 1 serves as a server and the PC 2 serves as a client. The PC 1 has a function of a print server with which printing can be performed from another information processing apparatus via the network 4 by using the printer 3 as a shared printer. It is assumed that the PC 1 has Japanese Windows™ XP installed and the PC 2 has US English Windows™ XP installed. The PC 2 transmits data (information) to the LM 36 in the PC 1 through printing and print spooler interfaces disclosed in the site of the MSDN, described above, and/or receives data (information) from the LM 36. Since this transmission-reception function is a known function of the Windows™ XP, a detailed description of the function is omitted here.

Figure 3:
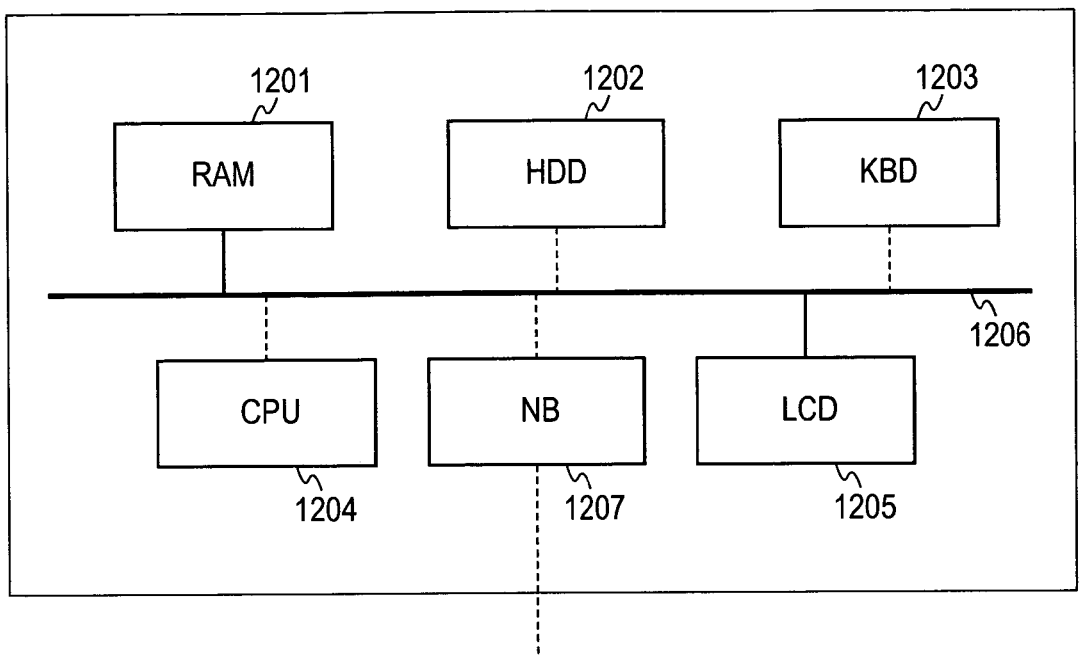
FIG. 3 is a block diagram showing an example of the hardware structure of a PC.

FIG. 3 is a block diagram showing an example of the hardware structure of a PC. Although any of the PCs 1 and 2 and PCs 70 and 72 described below has the hardware structure shown in FIG. 3, the PC 1 is exemplified for description. The PC 1 includes a random access memory (RAM) 1201; a hard disk drive (HDD) 1202 serving as a storage unit; a keyboard (KBD) 1203, which is an example of an input unit; a central processing unit (CPU) 1204 serving as a control unit; a display (liquid crystal display (LCD)) 1205, which is an example of a display unit; a network board (NB) 1207, which is an example of a communication control unit; and a bus 1206 via which the above components in the PC 1 are connected to each other. The storage unit may be a portable compact disc-read only memory (CD-ROM) or an internal ROM. The modules (the LM 36 and the LM resource 6) in the PC 1, shown in FIG. 1, are stored in the HDD 1202. The modules are read out into the RAM 1201, if necessary, and the CPU 1204 executes the readout modules to realize the functions of the modules in FIG. 1.

Figure 4:
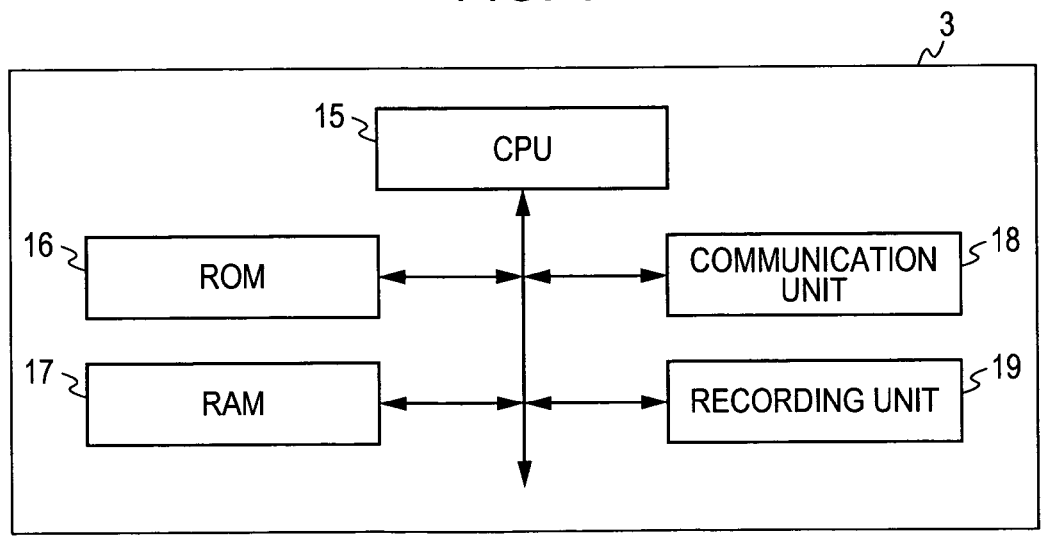
FIG. 4 is a block diagram showing the hardware structure of a printer.
Figure 5:
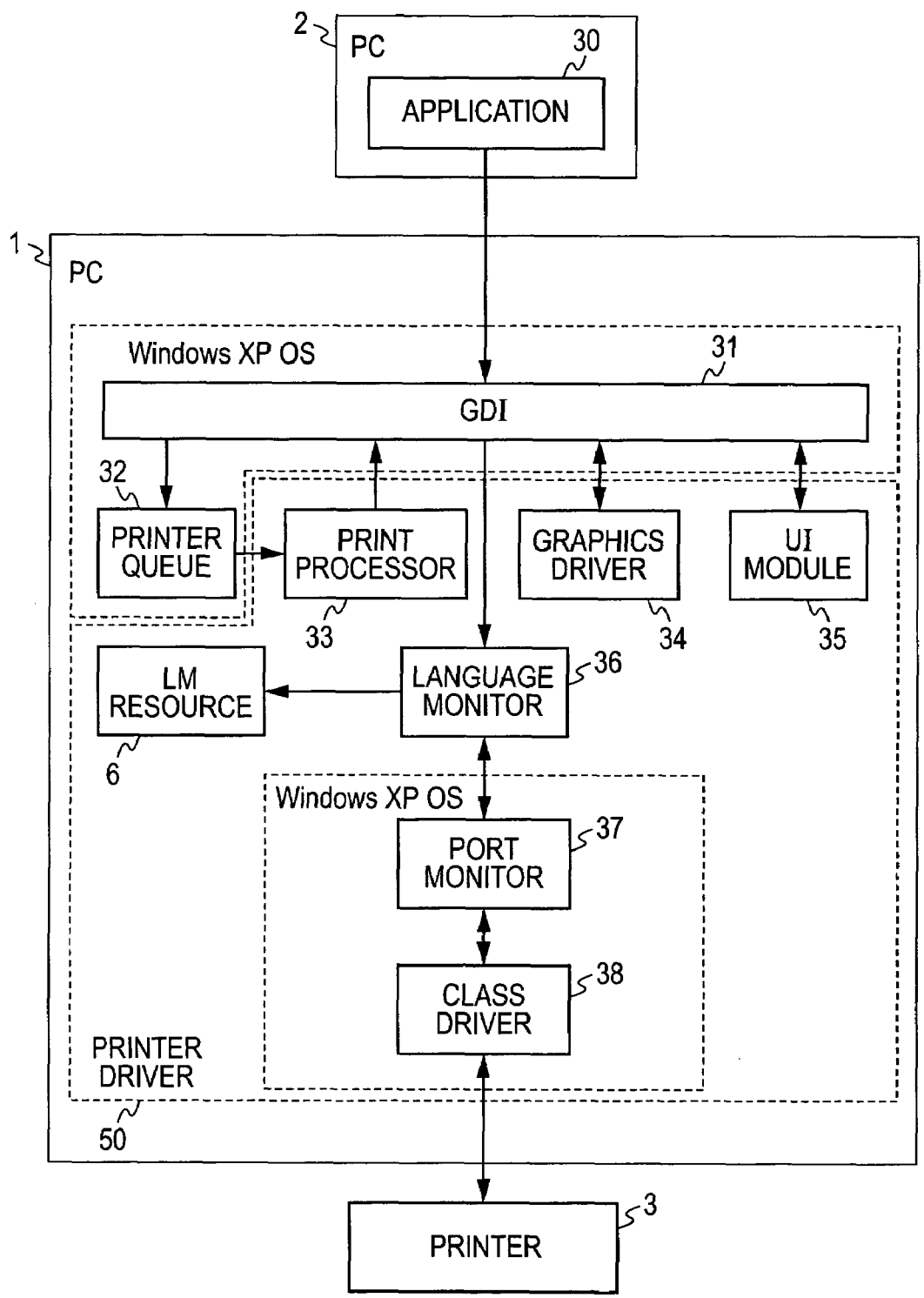
FIG. 5 is a block diagram showing the structure of a printer driver in the PC.

FIG. 4 is a block diagram showing the hardware structure of a printer. The printer 3 has the hardware structure shown in FIG. 4. Referring to FIG. 4, a CPU 15 is, for example, a microprocessor and functions as the central processing unit of the printer 3 to control a RAM 17, a communication unit 18, and a recording unit 19 in accordance with programs stored in a read only memory (ROM) 16.

The ROM 16 stores the programs used by the printer 3 to perform recording (printing) or to indicate statuses to the PC 1 under the control of a printer driver 50 (described below with reference to FIG. 5).

The RAM 17 temporarily stores print data that is mainly transmitted from the PC 1 and is to be printed by the recording unit 19. The communication unit 18 includes a connection port to USB interface 9 and controls the USB communication. The recording unit 19 includes a recording section including an inkjet recording head, color ink, a carriage, a sheet carrier, etc., and an electrical circuit, such as an application specific integrated circuit (ASIC), used for generating a printing pulse at the recording head based on the print data. The display content of a file opened in a printable application (image data in the file) is temporarily stored in the HDD 1202 in the PC 1 as an enhanced metafile (EMF) spool file by a printing operation in the application, is converted into the print data including a control command for the printer 3 through the printer driver 50, and then is transmitted to the printer 3 through the USB interface 9. The print data received by the printer 3 is converted into the printing pulse in the recording unit 19 and is printed on a sheet.

FIG. 5 is a block diagram showing the structure of the printer driver 50 in PC 1. Referring to FIG. 5, the printer driver 50 is installed in the PC 1 and includes a plurality of modules denoted by reference numerals 32 to 38, described below. The application 30 is application software with which a print instruction or the status of a printer can be displayed and corresponds to, for example, Notepad (notepad.exe), which is a text editor normally supplied with the Windows™ XP. According to the first embodiment, the application 30 is the status monitor described below with reference to FIG. 8. A graphic device interface (GDI) 31 is part of the Windows™ XP. A printer queue 32 is part of a spooler of the Windows™ XP and queues print jobs. The structure of the printer driver 50 will be described next. A print processor 33 changes a print layout or performs special processing for a printed image. A graphics driver 34 functions as a core of the image processing in the printer driver 50 and performs the image processing for printing based on a drawing instruction supplied from the GDI 31 to create a print control command. A user interface (UI) module 35 supplies and controls a user interface of the printer driver 50. The language monitor 36 controls transmission and/or reception of data as a data communication interface. A port monitor 37 transmits the data supplied from the language monitor 36 to an appropriate port and/or receives the data transmitted from the printer 3 through a class driver 38. The class driver 38, which is a low-level module closest to the port, corresponds to a driver in a USB printer class in the embodiments of the present invention and controls the port (the USB port in the embodiments of the present invention). Since the printer driver 50 is ready for multiple languages, the printer driver 50 is ready for all the languages supported by the Windows™ XP, which is an OS ready for multiple languages, and has character string resources and so on for all the languages.

Since the Japanese Windows™ XP is installed in the PC 1, the printer driver 50 in the PC 1 supports the Japanese Windows™ XP and the US English Windows™ XP owing to specifications of the printer driver 50 on a Japanese OS. The printer driver 50 is manufactured by the XYZ company, which is the manufacturer of the printer 3.

Figure 8:
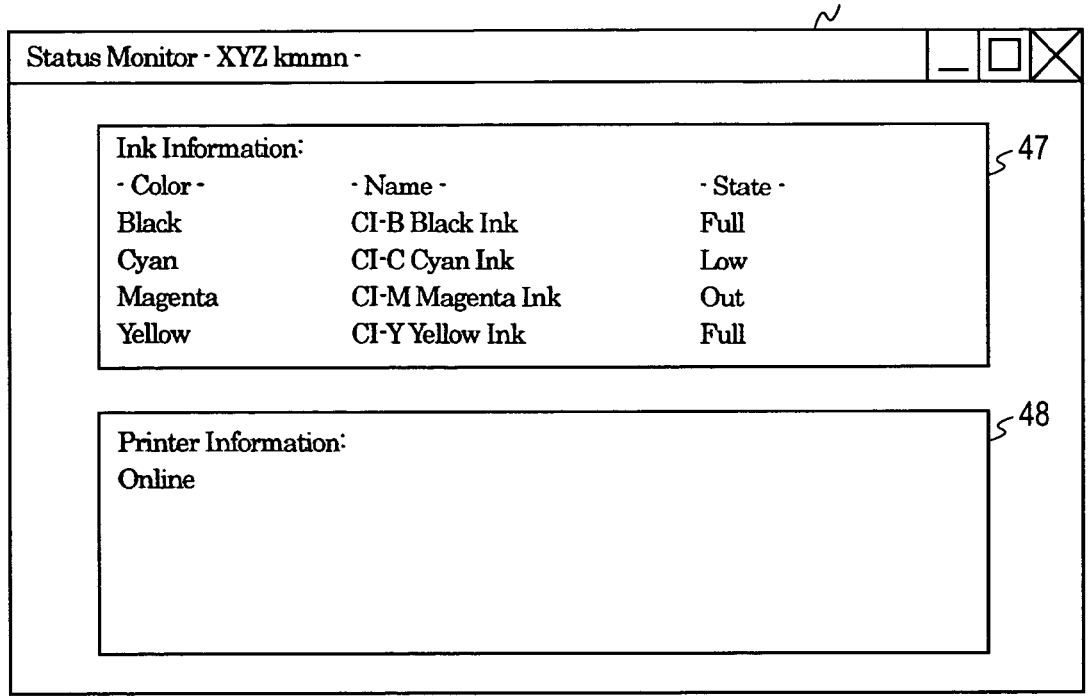
FIG. 8 shows a status monitor monitoring the status of the printer in a US English OS environment, according to the first embodiment.

FIG. 8 shows a status monitor monitoring the status of a printer in a US English OS environment. The status monitor in FIG. 8 corresponds to the application 30 installed in the PC 2. Since the US English Windows™ XP is installed in the PC 2, the US English display is provided on the screen of the PC 2. Referring to FIG. 8, the current state of the printer 3 (having the model name kmmn and being manufactured by the XYZ company) is displayed in a main window 46 of the status monitor. The states of ink loaded in the printer 3 are displayed in an ink-information display area 47. As shown in FIG. 8, the printer 3 loads four colors of ink: black (Black), cyan (Cyan), magenta (Magenta), and yellow (Yellow). The "Name" (name) of the black ink is "CI-B Black Ink", the "Name" (name) of the cyan ink is "I-C Cyan Ink", the "Name" (name) of the magenta ink is "I-M Magenta Ink", and the "Name" (name) of the yellow ink is "CI-Y Yellow Ink". The black ink is in a state "Full" (full), the cyan ink is in a state "Low" (a low amount of ink remains), the magenta ink is in a state "Out" (no amount of ink remains), and the yellow ink is in the state "Full" (full). The fact that the printer is in an "Online" (online) state is displayed in a printer-information display area 48.

Figure 10:
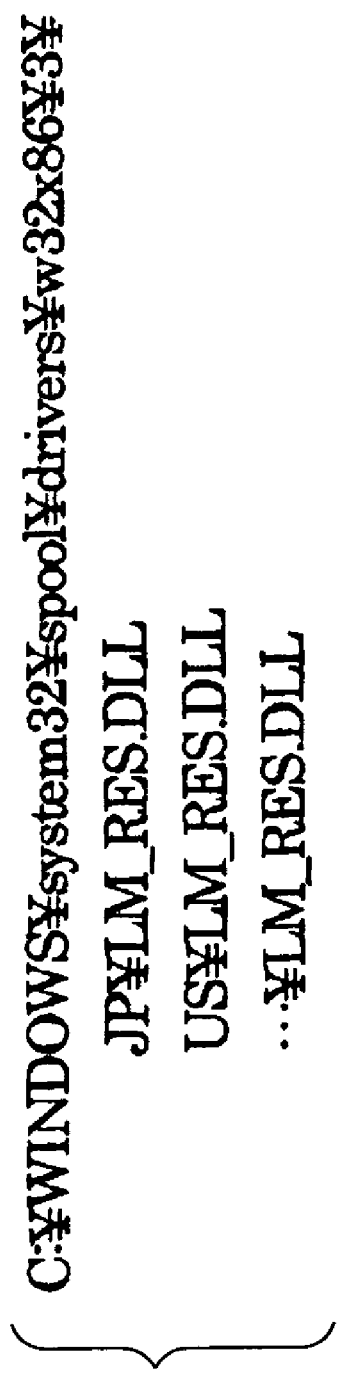
FIG. 10 illustrates a storage folder and the state of storage of an LM resource.

FIG. 10 illustrates a storage folder and the state of storage of the LM resource 6. An example in which the Windows™ XP is installed in the "C:\" drive of the PC 1 is shown in FIG. 10. The LM resource 6 is the dynamic link library for Windows™ and corresponds to "LM_RES.DLL" files. As described above with reference to FIG. 5, since the printer driver 50 is ready for multiple languages, the LM resource 6 includes the character string resources for all the supported languages. The character string resources for the languages are stored in folders provided for every language in the same file name ("LM_RES.DLL"), as shown in FIG. 10. For example, the LM resource 6 for Japanese is stored in a JP folder in "C:\WINDOWS\system32\spool\drivers\w32x86\3\" and the LM resource 6 for US English is stored in a US folder therein.

FIGS. 14 and 15 show schemas used when the application (status monitor) 30 acquires the information concerning the ink and the states of the ink from the printer 3. The schemas are specified as arguments in the call of an application program interface (API) function "IBidiSpl::SendRecv( )" of a COM interface "IBidiSpl" used in the Windows™ XP when the application 30 acquires the information concerning the ink and the states of the ink from the printer 3 through the LM 36 and the printing and print spooler interfaces.

Referring to FIG. 14, "InkInfo" has a node type "Property" and indicates information concerning ink. The full path to the "InkInfo" in the schema is "\Printer.InkInfo". "[Color]" has the node type "Property" and indicates information concerning color. The full path to the "[Color]" in the schema is "\Printer.InkInf[Color]". Allowed values are "Black" indicating black, "Cyan" indicating cyan, "Magenta" indicating magenta, and "Yellow" indicating yellow. When the information concerning the black ink is to be acquired, "\Printer.InkInfo.Black" is specified. "Installed" has a node type "Value" and a data type "Boolean", and indicates whether the [Color] ink is loaded. The full path to the "Installed" in the schema is "\Printer.InkInfo[Color]:Installed". Allowed values are "True" indicating that the [Color] ink is loaded and "False" indicating that the [Color] ink is not loaded. "State" has the node type "Value" and a data type "String", and indicates the state of the remaining amount of the [Color] ink. The full path to the "State" in the schema is "\Printer.InkInfo[Color]:State". Allowed values are "Full" indicating that the [Color] ink is full, "Low" indicating that the remaining amount of the [Color] ink is low, "Out" indicating that the [Color] ink is out, and "Unknown" indicating that the remaining amount of the [Color] ink is unknown.

Referring to FIG. 15, "DisplayName" has the node type "Property" and indicates the name of the [Color] ink localized into a certain language. The full path to the "DisplayName" in the schema is "\Printer.InkInfo[Color].DisplayName". "Language" has the node type "Property" and indicates a language ID. The full path to the "Language" in the schema is "\Printer.InkInfo[Color].DisplayName[Language]". Allowed values are a character string (char*) resulting from conversion of a language ID (unsigned short type) acquired by calling an API function "GetUserDefaultLangID( )" or the like used in the Windows™ XP, for example, "1033" indicating the US English or "1041" indicating the Japanese, and "Auto" specified when the application 30 causes the LM 36 or the printer 3 to automatically select an appropriate language without specifying the language ID from the application 30. "Name" has the node type "Value and a data type "Unicode string", and indicates the name of the [Color] ink localized into a certain language. The full path to the "Name" in the schema is "\Printer.InkInfo[Color].DisplayName:Name". Allowed values are Unicode character strings shown in "Examples" in FIG. 15.

Referring to FIGS. 14 and 15, the node type "Value" of the "Installed", "State", and "Name" is a value returned from the LM 36 or the printer 3 to the application 30. In this manner, the application (status monitor) 30 acquires the information concerning the ink loaded in the printer 3 and the states of the ink by using the schemas defined in FIGS. 14 and 15.

FIG. 16 shows schemas and values when the schemas defined in FIGS. 14 and 15 are used to enumerate the information and states of ink. Referring to FIG. 16, when the application (status monitor) 30 specifies the "\Printer.InkInfo" schema to call the "IBidiSpl::SendRecv( )" function (Query(Schema) column), sets of schemas (Retrieve (Schema)) describing the information and states of the ink of all the colors loaded in the printer 3 and values (Retrieve (Value)) are returned. In the example in FIG. 16, the black, cyan, magenta, and yellow ink is loaded in the printer 3, and the respective states of the remaining amount of the ink are the "Full" indicating that the ink is full, the "Low" indicating that the remaining amount of the ink is low, the "Out" indicating that the ink is out, and the "Full" indicating that the ink is full. The names of the ink localized into US English are "CI-B Black Ink", "CI-C Cyan Ink", "CI-M Magenta Ink", and "CI-Y Yellow Ink", while the names of the ink localized into Japanese are CI-B 黒インク(kuro-inku)", "CI-C シアンインク (sian-inku)", "CI-M マゼンタインク (mazenta-inku)", and "CI-Y 黄インク (ki-inku)".

FIG. 17 shows schemas and values when the schemas defined in FIGS. 14 and 15 are used to get the name of ink. Referring to FIG. 17, for example, in order to acquire the US English (USEnglish) name of black ink, when the application (status monitor) 30 specifies a schema "\Printer.InkInfo.Black.DisplayName.1033:Name" to call the "IBidiSpl::SendRecv( )" function (Query(Schema) column), a set of "\Printer.InkInfo.Black.DisplayName.1033:Name" as the schema (Retrieve(Schema)) describing the name of the black ink loaded in the printer 3 and "CI-B Black Ink" as the value (Retrieve(Value)) is returned.

For example, in order to acquire the Japanese name of cyan ink, when a schema "\Printer.InkInfo.Cyan.DisplayName.1041:Name" is specified from the application (status monitor) 30 to call the "IBidiSpl::SendRecv( )" function (Query(Schema) column), a set of "\Printer.InkInfo.Cyan.DisplayName.1041:Name" as the schema (Retrieve(Schema)) describing the name of the cyan ink loaded in the printer 3 and "CI-B シアンインク (sian-inku)" as the value (Retrieve(Value)) is returned.

For example, in order to specify the automatic selection of an appropriate language to acquire the name of yellow ink, when a schema "\Printer.InkInfo.Yellow.DisplayName.Auto:Name" is specified from the application (status monitor) 30 to call the "IBidiSpl::SendRecv( )" function (Query(Schema) column), a set of "\Printer.InkInfo.Yellow.DisplayName.Auto:Name" as the schema (Retrieve(Schema)) describing the name of the yellow ink loaded in the printer 3 and "CI-B Yellow Ink" as the value (Retrieve(Value)) is returned.

Figures 18, 19:
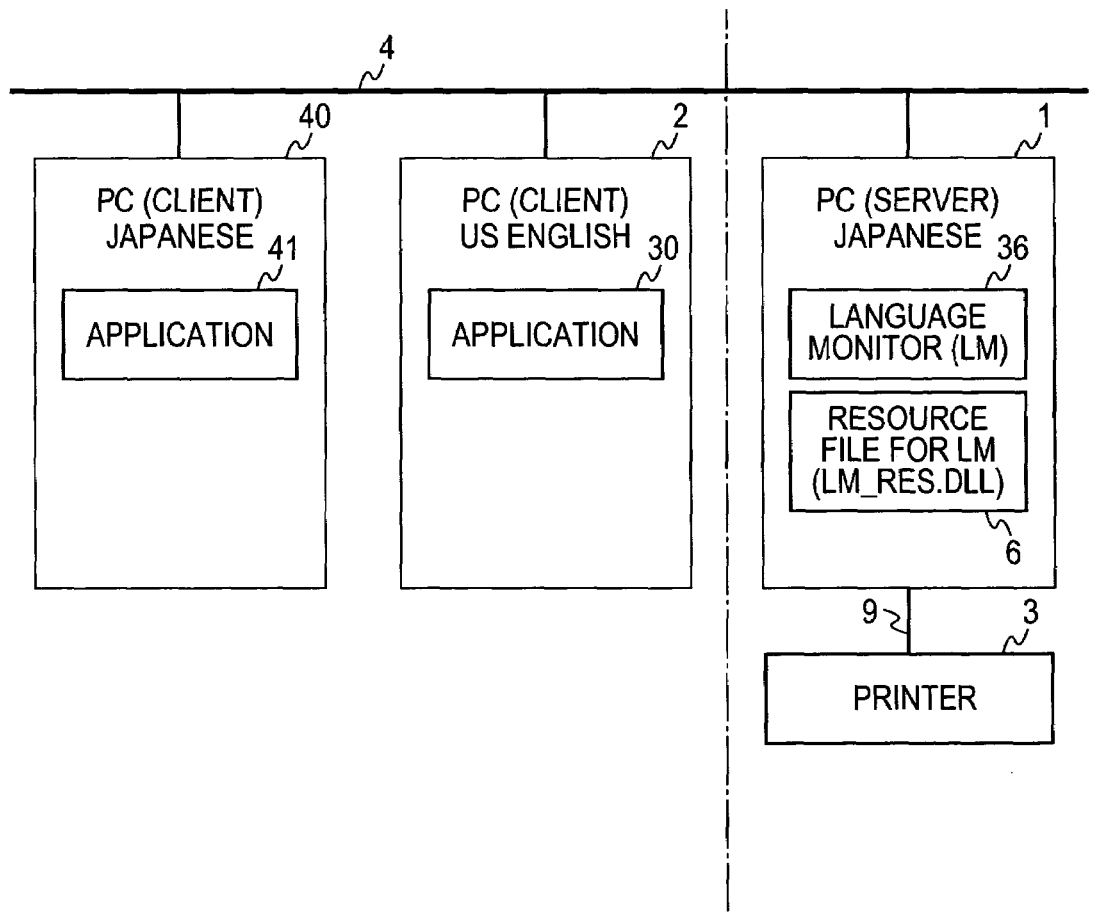
FIG. 18 shows the specifications of a function newly defined to realize an embodiment of the present invention.
FIG. 19 is a block diagram showing the structure of a peripheral-device control system including an information processing apparatus and a peripheral device, according to a second embodiment of the present invention.

FIG. 18 shows the specifications of a function newly defined to realize the first embodiment. At the current time, such a function does not exist as an API function used in the Windows™ XP. The specifications of an API function "LoadLibrary( )" used in the Windows™ XP are as follows:

```
HMODULE
LoadLibrary(
LPCTSTR lpFileName
);
```

The function newly defined has an argument "LANGID languageId" specifying a language ID added. A function "LoadLibraryForMultiLanguage( )" has specifications in which a resource file (module) that has the file name specified as "lpFileName" and corresponds to the language ID specified in the "languageId" is loaded and a handle of the module is returned. For example, when the LM 36 uses this function to load the LM resource 6 where "LoadLibraryForMultiLanguage("LM_RES.DLL", languageId);" is called, the OS loads the LM_RES.DLL file in the folder corresponding to the language ID specified in the "languageId" from among the LM_RES.DLL files stored in the folders provided for every language, shown in FIG. 10, and the handle of the module is returned.

FIGS. 22A and 22B are tables of IDs and character strings in the LM resource 6. In the LM resource 6 for US English shown in FIG. 22A, "CI-B Black Ink", "CI-C Cyan Ink", "CI-M Magenta Ink", and "CI-Y Yellow Ink" are mapped to "ID1", "ID2", "ID3", and "ID4", respectively. In the LM resource 6 for Japanese shown in FIG. 22B, "CI-B 黒インク (kuro-inku)", "CI-C シアンインク (sian-inku)", "CI-M マゼンタインク (mazenta-inku)", and "CI-Y 黄インク (ki-inku)" are mapped to "ID1", "ID2", "ID3", and "ID4", respectively. These are the names of ink for the printer 3, manufactured by the XYZ company, and are official names defined by the XYZ company, which is the manufacturer of the printer 3 and the ink.

FIG. 23 shows data when the PC 1 (PC 70 in FIG. 2) acquires ink information from the printer 3. Although the data actually communicated between the PC 1 (PC 70) and the printer 3 is binary data, the data is represented as text data after being encoded in an ASCII character code for clarity in FIG. 23. Referring to FIG. 23, when the PC 1 (PC 70) issues a request command to the printer 3 through the USB interface 9, the ink information is returned from the printer 3 to the PC 1 (PC 70) through the USB interface 9. The ink information has the following content.

| <Color> | <Type name> | <State> |
|---|---|---|
| Black | CI-B | Full |
| Cyan | CI-C | Low |
| Magenta | CI-M | Out |
| Yellow | CI-Y | Full |

Figure 26:
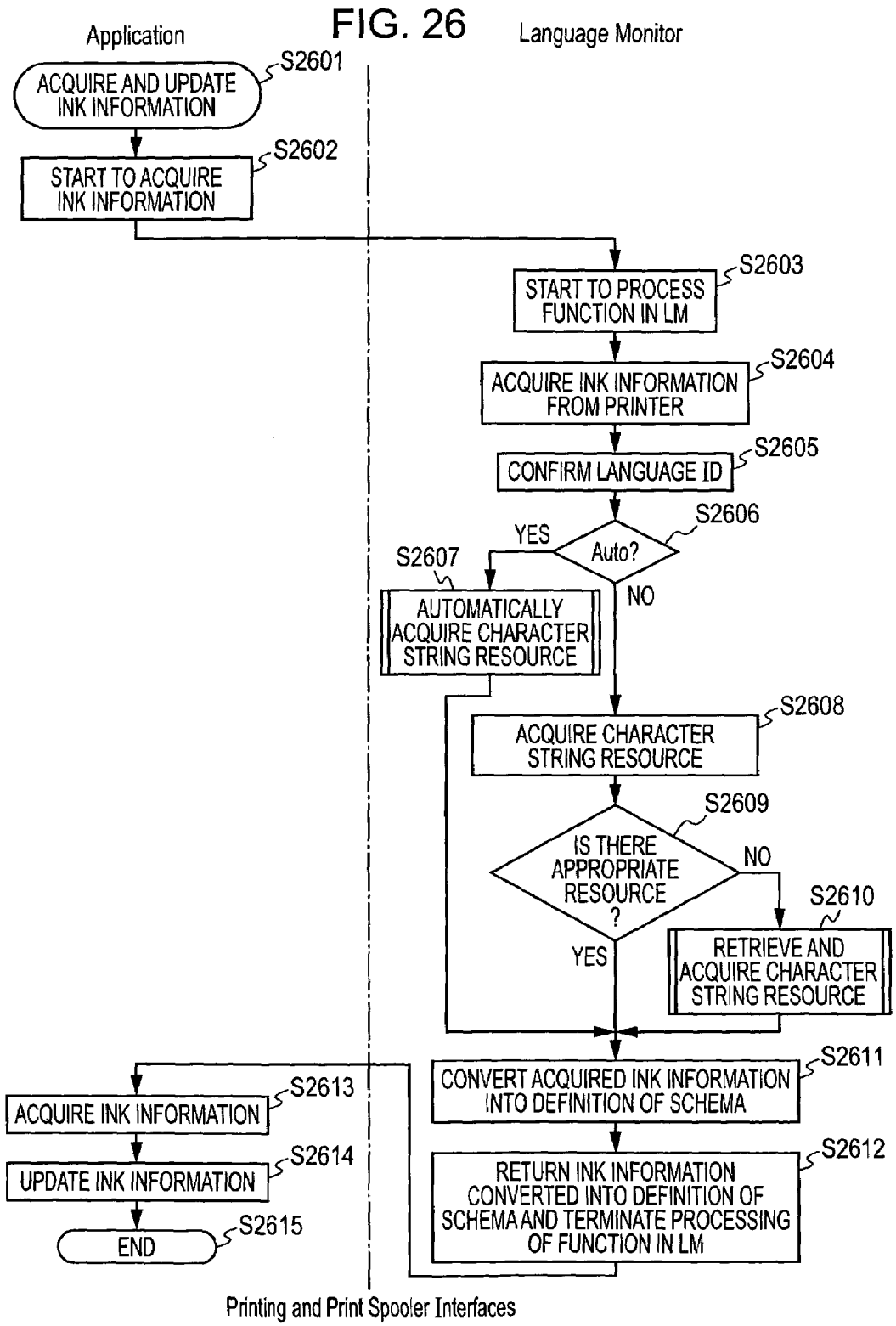
FIG. 26 is a flowchart showing a process in which the application (status monitor) acquires information concerning the ink loaded in the printer to update the display in an ink-information display area in FIG. 8, according to the first embodiment.

The operation of the peripheral-device control system according to the first embodiment will be described next with reference to flowcharts shown in FIGS. 26 to 28. FIG. 26 is a flowchart showing a process in which the application (status monitor) 30 acquires information concerning the ink loaded in the printer 3 to update the display in the ink-information display area 47. The application (status monitor) 30 that acquires information concerning the black ink to update the display in the ink-information display area 47 is exemplified.

Referring to FIG. 26, in Step S2601, the application 30 starts to acquire the information concerning the ink loaded in the printer 3 to update the display in the ink-information display area 47. The application 30 calls the API function "GetUserDefaultLangID( )" used in the Windows™ XP to check a language ID (unsigned short type). The application 30 determines that the language ID is "1033" indicating the language ID of US English because US English Windows™ XP is installed in the PC 2. In Step S2602, the application 30 calls the API function "IBidiSpl::SendRecv( )" of the COM interface "IBidiSpl" by using the "\Printer.InkInfo.Black.DisplayName.1033:Name" schema, defined in FIG. 15, as the argument based on the language ID to start to acquire the ink information. In Step S2603, a spooler (since the spooler is part of the function of the Windows™ XP, a detailed description and drawing is omitted) in the PC 1 calls a function "SendRecvBidiDataFromPort( )" exported by the LM 36 through the printing and print spooler interfaces to start the processing in this function.

The PC 1 issues a request command in the "SendRecvBidiDataFromPort( )" function in the LM 36, as shown in FIG. 23, and, in Step S2604, the PC 1 acquires the ink information returned from the printer 3. In Step S2605, the PC 1 checks a language ID in the "\Printer.InkInfo.Black.DisplayName.1033:Name" schema specified as an argument of the "SendRecvBidiDataFromPort( )" function to determine that the language ID is "1033" indicating the language ID of US English. In Step S2606, the PC 1 determines whether the language ID is "Auto". If the PC 1 determines that the language ID is not "Auto", in Step S2608, the PC 1 attempts to acquire the character string resource from the LM resource 6 loaded with the API function "LoadLibrary( )" used in the Windows™ XP, by using the table of the IDs and the character strings, shown in FIG. 22A, based on the language ID. In Step S2609, the PC 1 determines whether the corresponding resource exists. If the PC 1 determines that the corresponding resource exists, in Step S2611, the PC 1 converts the acquired ink information in accordance with the definition in the "\Printer.InkInfo.Black.DisplayName.1033:Name" schema, specified as an argument of the "SendRecvBidiDataFromPort( )" function based on the acquired character string resource. In Step S2612, the PC 1 returns the ink information converted into the definition of the schema in FIG. 17 as an argument of the "SendRecvBidiDataFromPort( )" function and terminates the processing by the "SendRecvBidiDataFromPort( )" function in the LM 36.

In Step S2613, the application 30 receives the returned "IBidiSpl::SendRecv( )" function and acquires the ink information returned as an argument in the definition of schema in FIG. 17. In Step S2614, the application 30 updates the information in the ink-information display area 47 in FIG. 8. In Step S2615, the application 30 terminates the process of acquiring the information concerning the ink loaded in the printer 3 to update the display in the ink-information display area 47.

If the PC 1 determines in Step S2606 that the language ID is "Auto", in Step S2607, the PC 1 performs a process of automatically acquiring the character string resource, described below with reference to FIG. 28, and proceeds to Step S2611. If the PC 1 determines in Step S2609 that the corresponding resource does not exist, in Step S2610, the PC 1 performs a process of retrieving and acquiring the character string resource, described below with reference to FIG. 27, and proceeds to Step S2611. The application 30 normally repeats the process of acquiring the information concerning the ink loaded in the printer 3 to update the display in the ink-information display area 47, started from Step S2601, while varying the schema, such as "\Printer.InkInfo.Cyan.DisplayName.1033:Name" or "\Printer.InkInfo.Black:State", indicating the color of ink or the state of the remaining amount of ink to acquire all the information to be displayed in the ink-information display area 47 and to update the display. Repeating the series of steps at predetermined intervals, for example, once every five seconds, displays the information and the states of the ink loaded in the printer 3 in the ink-information display area 47 in real time. When the "Name" (name) in the ink-information display area 47 is to be updated in Step S2614, the application 30 uses the value (character string) returned as "Name" ("\Printer.InkInfo[Color].DisplayName:Name") of the schema, defined in FIG. 15, in Step S2613, to update the information in the ink-information display area 47 in Step S2614.

Figure 27:
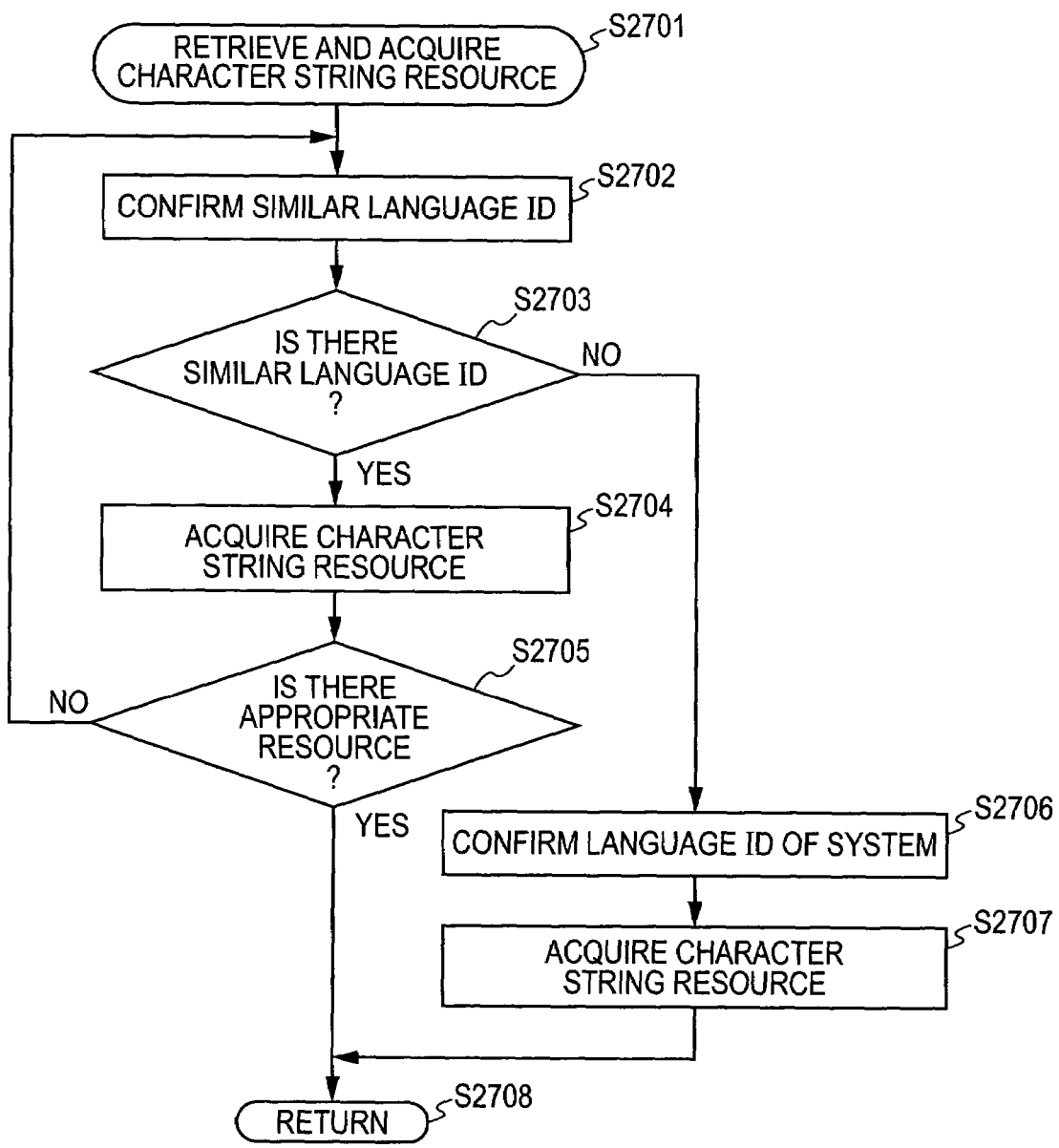
FIG. 27 is a flowchart showing the process of retrieving and acquiring a character string resource, according to the first embodiment.

FIG. 27 is a flowchart showing the process of retrieving and acquiring the character string resource. In Step S2701, the PC 1 starts the process of retrieving and acquiring the character string resource. The PC 1 converts the language ID in the schema, determined in FIG. 26, into the language ID (LANGID) (unsigned short type) defined in the Windows™ XP. The language ID defined in the Windows™ XP has a major language attribute and a minor language attribute, for example, defined as follows:

| Major language attribute | Minor language attribute |
|---|---|
| English | US English |
| English | Canada English |

Accordingly, in Step S2702, the PC 1 confirms a language ID that differs in the minor language attribute from other languages having the same major language attribute. In Step S2703, the PC 1 determines whether there is a similar language ID. If the PC 1 determines that there is a similar language ID, in Step S2704, the PC 1 attempts to acquire the character string resource from the LM resource 6 loaded with the API function "LoadLibrary( )" used in the Windows™ XP, by using the table of the IDs and the character strings, as shown in FIGS. 22A and 22B, based on the language ID. In Step S2705, the PC 1 determines whether the corresponding character string resource exists. If the PC 1 determines that the corresponding character string resource exists, in Step S2708, the PC 1 returns the acquired character string resource and terminates the function.

If PC 1 determines in Step S2703 that there is no similar language, in Step S2706, the PC 1 calls an API function "GetSystemDefaultLangID( )" used in the Windows™ XP to determine the language ID (unsigned short type). In Step S2707, the PC 1 acquires the character string resource from the LM resource 6 loaded with the API function "LoadLibrary( )" used in the Windows™ XP, by using the table of the IDs and the character strings, as shown in FIGS. 22A and 22B, based on the language ID. In Step S2708, the PC 1 returns the acquired character string resource and terminates the function. If the PC 1 determines in Step S2705 that the corresponding character string resource does not exist, the PC 1 goes back to Step S2702 to repeat the check of a language ID that differs in the minor language attribute from other languages having the same major language attribute.

Figure 28:
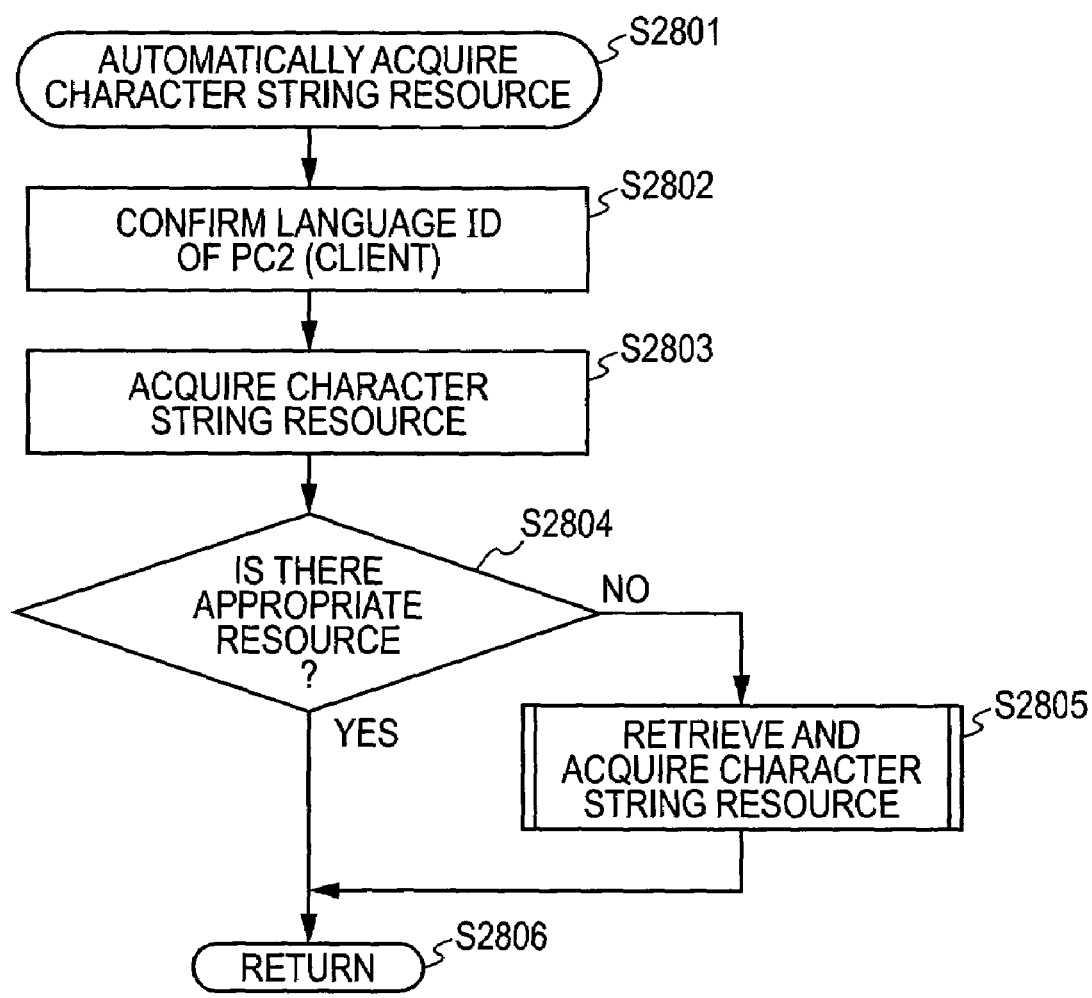
FIG. 28 is a flowchart showing the process of automatically acquiring the character string resource, according to the first embodiment.

FIG. 28 is a flowchart showing the process of automatically acquiring the character string resource. In Step S2801, the PC 1 starts the process of automatically acquiring the character string resource. In Step S2802, the PC 1 checks a language ID of the PC 2 to determine that the language ID is "1033" indicating the language ID of US English because the US English Windows™ XP is installed in the PC 2. In Step S2803, the PC 1 attempts to acquire the character string resource from the LM resource 6 loaded with the API function "LoadLibrary( )" used in the Windows™ XP, by using the table of the IDs and the character strings, shown in FIG. 22A, based on the language ID. In Step S2804, the PC 1 determines whether the corresponding character string resource exists. If the PC 1 determines that the corresponding character string resource exists, in Step S2806, the PC 1 returns the acquired character string resource and terminates the function. If the PC 1 determines in Step S2804 that the corresponding character string resource does not exist, in Step S2805, the PC 1 performs the process of retrieving and acquiring the character string resource shown in FIG. 27. In Step S2806, the PC 1 returns the acquired character string resource and terminates the function.

FIG. 31 shows a sample program of a series of processes of determining the language ID in the "SendRecvBidiData-FromPort( )" function exported by the LM 36 to acquire the character string resource.

As shown in comments in FIG. 31, the sample program is an example of the program for implementing the processes corresponding to some of the steps in FIG. 26. Since the processes are the API functions or the standard functions in a C language used in the Windows™ XP, a description is omitted herein.

FIG. 32 shows another sample program of a series of processes of determining the language ID in the "SendRecvBidi-DataFromPort( )" function exported by the LM 36 to acquire the character string resource.

As shown in comments in FIG. 32, the sample program is an example of the program for implementing the processes corresponding to some of the steps in FIG. 26. FIG. 32 shows that the "LoadLibraryForMultiLanguage( )" function newly defined, shown in FIG. 18, is used to load the LM resource 6. Since the processes, other than the process using the "LoadLibraryForMultiLanguage( )" function, are the API functions or the standard functions in the C language used in the Windows™ XP, a description is omitted herein. Comparison between FIGS. 31 and 32 shows that the use of the "LoadLibraryForMultiLanguage( )" function newly defined makes the implementation in the language monitor easy to prevent occurrences of coding errors.

Second Embodiment

A second embodiment of the present invention will be described below.

FIG. 19 is a block diagram showing the structure of a peripheral-device control system including an information processing apparatus and a peripheral device, according to the second embodiment of the present invention. PCs 1 and 2 in FIG. 19 are the same as the PCs 1 and 2 in FIG. 1. An information processing apparatus 40 is a common personal computer (PC). The PC 40 has the hardware structure shown in FIG. 3 and has the Windows™ XP installed as the operating system (OS). The PC 1, the PC 2, and the PC 40 are connected to each other via a network 4, which is Ethernet™, and are capable of two-way communication with each other. A printer 3 in FIG. 19 is the same as the printer 3 in FIG. 1. An LM 36 in FIG. 19 is the same as the LM 36 in FIG. 5. A LM resource 6 in FIG. 19 is the same as the LM resource 6 in FIG. 1. A USB interface 9 in FIG. 19 is the same as the USB interface 9 in FIG. 1. An application 30 in FIG. 19 is the same as the application (status monitor) 30 in FIG. 1. An application 41 includes executable files (*.exe) for Windows™. The application 41 is exemplified by a status monitor described below with reference to FIG. 9.

The application (status monitor) 41 is manufactured by MMN company. In the peripheral-device control system according to the second embodiment, the PC 1 serves as a server and the PCs 2 and 40 serve as clients. The PC 1 has a function of a print server with which printing can be performed from another information processing apparatus via the network 4 by using the printer 3 as a shared printer. It is assumed that the PC 40 has Japanese Windows™ XP installed. The PCs 2 and 40 transmit data (information) to the LM 36 in the PC 1 through the printing and print spooler interfaces disclosed in the site of the MSDN, described above, and/or receive data (information) from the LM 36. Since this transmission-reception function is a known function of the Windows™ XP, a detailed description of the function is omitted here.

Figure 9:
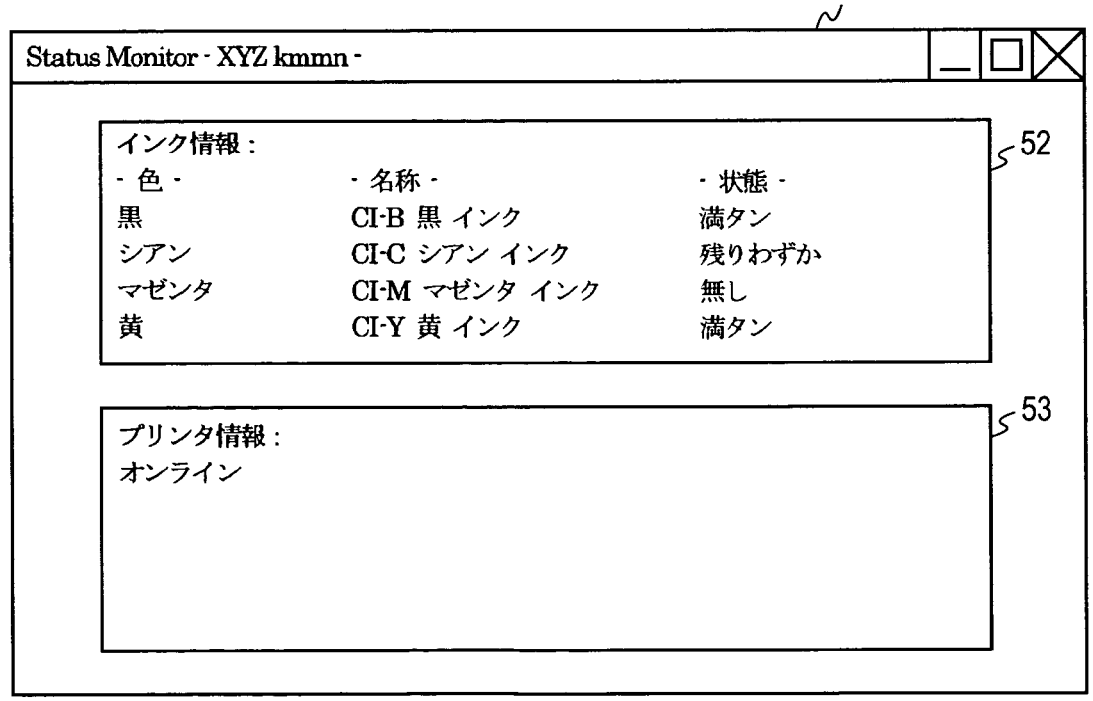
FIG. 9 shows a status monitor monitoring the status of the printer in a US English OS environment, according to the second embodiment.

FIG. 9 shows a status monitor monitoring the status of a printer in a Japanese OS environment. The status monitor in FIG. 9 corresponds to the application 41 installed in the PC 40 shown in FIG. 19. Since the Japanese Windows™ XP is installed in the PC 40, the Japanese display is provided on the screen of the PC 40. Referring to FIG. 9, the current state of the printer 3 (having the model name kmmn and being manufactured by XYZ company) is displayed in a main window 51 of the status monitor. The states of ink loaded in the printer 3 are displayed in an ink-information display area 52. As shown in FIG. 9, the printer 3 loads four colors of ink; black (黒(kuro))・, cyan シアン, magenta マゼンタ and yellow (黄(ki))・. The name of the black ink is "CI-B 黒インク (kuro-inku)", the name of the cyan ink is "I-C シアンインク (sian-inku)", the name of the magenta ink is "I-M マゼンタインク (mazenta-inku)", and the name of the yellow ink is "CI-Y 黄インク (ki-inku)". The black ink is in a state 満タン (mantan)" (full), the cyan ink is in a state "残りわずか (nokori wazuka)" (a low amount of ink remains), the magenta ink is in a state "無し (nashi)" (no amount of ink remains), and the yellow ink is in the state "満タン (mantan)" (full). The fact that the printer is in an "オンライン (onrain)" (online) state is displayed in a printer-information display area 53. FIG. 9 shows the same states of the printer 3 as in FIG. 8 according to the first embodiment. The display in FIG. 9 differs from that in FIG. 8 in that the language is localized into Japanese.

The operation of the peripheral-device control system according to the second embodiment will be described next with reference to a flowchart shown in FIG. 29. FIG. 29 is a flowchart showing a process in which the application (status monitor) 30 acquires information concerning the ink loaded in the printer 3 to update the display in the ink-information display area 47 in FIG. 8. The application (status monitor) 30 that acquires information concerning the black ink to update the display in the ink-information display area 47 is exemplified.

Referring to FIG. 29, in Step S2901, the application 30 starts to acquire the information concerning the ink loaded in the printer 3 to update the display in the ink-information display area 47. The application 30 calls the API function "GetUserDefaultLangID( )" used in the Windows™ XP to check a language ID (unsigned short type). The application 30 determines that the language ID is "1033" indicating the language ID of US English because the US English Windows™ XP is installed in the PC 2. In Step S2902, the application 30 calls the API function "IBidiSpl::SendRecv( )" of the COM interface "IBidiSpl" by using the "\Printer.InkInfo.Black.DisplayName.1033:Name" schema, defined in FIG. 15, as the argument based on the language ID to start to acquire the ink information. In Step S2903, the OS of the PC 1 checks a language ID from the schema to determine that the language ID is "1033" indicating the US English. In Step S2904, a spooler (since the spooler is part of the known function of the Windows™ XP, a detailed description and drawing is omitted) creates a print thread having this language ID. In Step S2905, the PC 1 calls the "SendRecvBidiDataFromPort( )" function exported by the LM 36 through the printing and print spooler interfaces in the thread to start the processing in this function.

In Step S2906, the PC 1 issues a request command in the SendRecvBidiDataFromPort( ) function in the LM 36, as shown in FIG. 23, to acquire the ink information returned from the printer 3. In Step S2907, the PC 1 acquires the character string resource from the LM resource 6 loaded with the API function "LoadLibrary( )" used in the Windows™ XP, by using the table of the IDs and the character strings, shown in FIG. 22A. In Step S2908, the PC 1 converts the acquired ink information in accordance with the definition in the "\Printer.InkInfo.Black.DisplayName.1033:Name" schema, specified as an argument of the "SendRecvBidiData-FromPort( )" function based on the acquired character string resource. In Step S2909, the PC 1 returns the ink information converted into the definition of the schema in FIG. 17 as an argument of the "SendRecvBidiDataFromPort( )" function and terminates the processing by the "SendRecvBidiData-FromPort( )" function in the LM 36.

In Step S2910, the application 30 receives the returned "IBidiSpl::SendRecv( )" function and acquires the ink information returned as an argument in the definition of schema in FIG. 17. In Step S2911, the application 30 updates the information in the ink-information display area 47 in FIG. 8. In Step S2912, the application 30 terminates the process of acquiring the information concerning the ink loaded in the printer 3 to update the display in the ink-information display area 47.

The application 30 normally repeats the process of acquiring the information concerning the ink loaded in the printer 3 to update the display in the ink-information display area 47, started from Step S2901, while varying the schema, such as "\Printer.InkInfo.Cyan.DisplayName.1033:Name" or "\Printer.InkInfo.Black:State", indicating the color of ink or the state of the remaining amount of ink to acquire all the information to be displayed in the ink-information display area 47 and to update the display. Repeating the series of steps at predetermined intervals, for example, once for every five seconds, displays the information and the states of the ink loaded in the printer 3 in the ink-information display area 47 in real time.

When the "Name" (name) in the ink-information display area 47 is to be updated in Step S2911, the application 30 uses the value (character string) returned as "Name" ("\Printer.InkInfo[Color].DisplayName:Name") of the schema, defined in FIG. 15, in Step S2910, to update the information in the ink-information display area 47 in Step S2911. Since the spooler calls the "SendRecvBidiDataFromPort( )" function in the LM 36 in the print thread having the attribute of the language ID (US English), the LM resource 6 loaded with the "LoadLibrary( )" function in Step S2007 is "C:\WINDOWS\system32\spool\drivers\w32x86\3\US\LM_RES.DLL" corresponding to the language ID in this thread, shown in FIG. 10.

Such processing is newly proposed because it is not implemented in the current Windows™ XP. Since the API function "LoadLibrary( )" used in the current Windows™ XP can be normally used to load the resource file for the language monitor (the LM resource 6) in the implementation in the language monitor (LM 36), the implementation in the LM 36 is easy. Steps S2903 and S2904 are performed in the OS, and such processing is newly proposed because it is not implemented in the current Windows™ XP.

As described above, the spooler in the server (PC 1) uses the language (language ID) adopted in the application (application 30) used by a user of the client (PC 2) to create the print thread having this language ID and calls the "SendRecvBidi-DataFromPort( )" function in the language monitor (LM 36) in this thread. Accordingly, even if the language (language ID) of the client (PC 2) does not coincide with that of the server (PC 1), the language monitor (LM 36) can use the language (language ID) adopted in the application to accurately display the information, as shown in FIG. 8, in the application (application 30) running on the client (PC 2) with simple implementation without special control. For example, also when the application 41 (status monitor) running on the PC 40 starts to acquire the information of the ink loaded in the printer 3 to update the display in the ink-information display area 52 in FIG. 9, the above processing is performed to display the information in the application 41 running on the PC 40, as shown in FIG. 9.

FIG. 33 shows a sample program of a series of processes of acquiring the character string resource in the "SendRecvBidi-DataFromPort( )" function exported by the LM 36. As shown in comments in FIG. 33, the sample program is an example of the program for implementing the process corresponding to Step S2907 in FIG. 29. Since the processes are the API functions or the standard functions in the C language used in the Windows™ XP, a description is omitted herein. A comparison between FIG. 33 and FIGS. 31 and 32 shows that, since the spooler creates the print thread having the attribute of the language ID to call the "SendRecvBidiDataFromPort( )" function in the language monitor (LM 36) in this thread, it is not necessary to confirm the language ID in the language monitor (LM 36) to make the implementation in the language monitor easy and to prevent occurrences of coding errors.

FIG. 34 shows schemas used when the application (status monitor) 30 acquires the information concerning the ink and the states of the ink from the printer 3. The schemas are specified as arguments in the call of the API function "IBidiSpl::SendRecv( )" of the COM interface "IBidiSpl" used in the Windows™ XP when the application 30 acquires the information concerning the ink and the states of the ink from the printer 3 through the LM 36 and the printing and print spooler interfaces.

Referring to FIG. 34, "InkInfo" has a node type "Property" and indicates information concerning ink. The full path to the "InkInfo" in the schema is "\Printer.InkInfo". "[Color]" has the node type "Property" and indicates information concerning color. The full path to the "[Color]" in the schema is "\Printer.InkInf[Color]". Allowed values are "Black" indicating black, "Cyan" indicating cyan, "Magenta" indicating magenta, and "Yellow" indicating yellow. When the information concerning the black ink is to be acquired, "\Printer.InkInfo.Black" is specified. "Installed" has a node type "Value" and a data type "Boolean", and indicates whether the [Color] ink is loaded. The full path to the "Installed" in the schema is "\Printer.InkInfo[Color]:Installed". Allowed values are "True" indicating that the [Color] ink is loaded and "False" indicating that the [Color] ink is not loaded. "State" has the node type "Value" and a data type "String", and indicates the state of the remaining amount of the [Color] ink. The full path to the "State" in the schema is "\Printer.InkInfo[Color]:State". Allowed values are "Full" indicating that the [Color] ink is full, "Low" indicating that the remaining amount of the [Color] ink is low, "Out" indicating that the [Color] ink is out, and "Unknown" indicating that the remaining amount of the [Color] ink is unknown. "DisplayName" has the node type "Value" and a data type "Unicode string", and indicates the name of the [Color] ink localized into a certain language. The full path to the "DisplayName" in the schema is "\Printer.InkInfo[Color]:DisplayName". Allowed values are Unicode character strings shown in "Examples" in FIG. 34.

FIG. 35 shows schemas and values when the schemas defined in FIG. 34 are used to enumerate the information and states of ink. Referring to FIG. 35, when the application (status monitor) 30 specifies the "\Printer.InkInfo" schema to call the "IBidiSpl::SendRecv( )" function (Query(Schema) column), sets of schemas (Retrieve(Schema)) describing the information and states of the ink of all the colors loaded in the printer 3 and values (Retrieve(Value)) are returned. In the example in FIG. 35, the black, cyan, magenta, and yellow ink is loaded in the printer 3, and the respective states of the remaining amount of the ink are the "Full" indicating that the ink is full, the "Low" indicating that the remaining amount of the ink is low, the "Out" indicating that the ink is out, and the "Full" indicating that the ink is full. The names of the black, cyan, magenta, and yellow ink are "CI-B Black Ink", "CI-C Cyan Ink", "CI-M Magenta Ink", and "CI-Y Yellow Ink", respectively.

Figure 36:
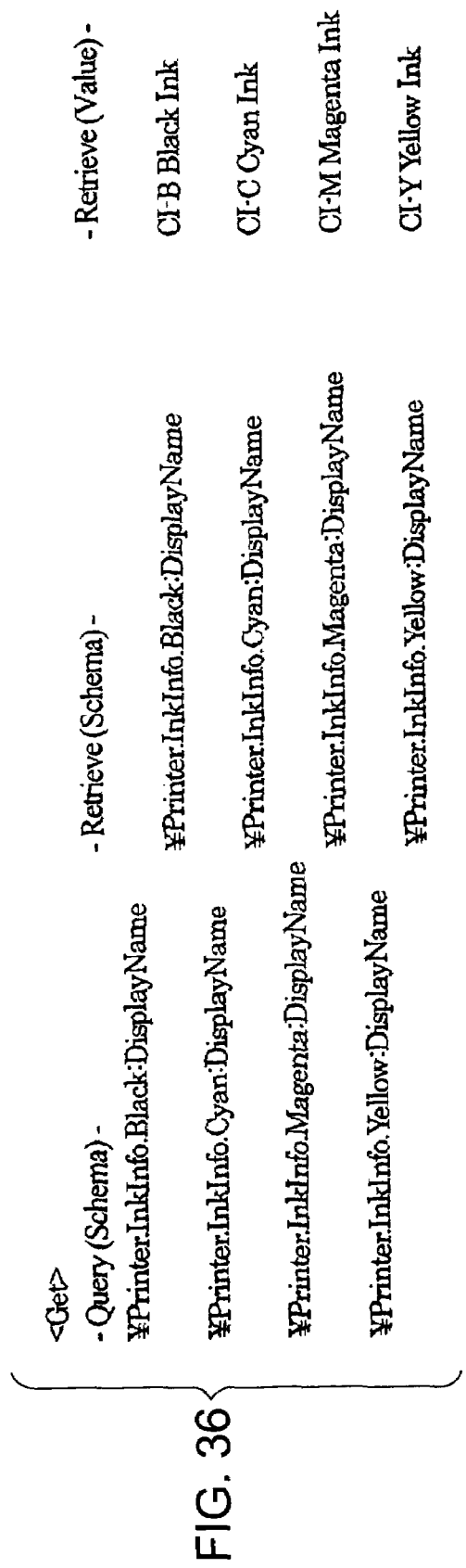
FIG. 36 shows schemas and values when the schemas defined in FIG. 34 are used to get the type name of ink, according to the second embodiment.

FIG. 36 shows schemas and values when the schemas defined in FIG. 34 are used to get the type name of ink. Referring to FIG. 36, for example, in order to acquire the type name of black ink, when the application (status monitor) 30 specifies a schema "\Printer.InkInfo.Black:DisplayName" to call the "IBidiSpl::SendRecv( )" function (Query(Schema) column), a set of "\Printer.InkInfo.Black:DisplayName" as the schema (Retrieve(Schema)) describing the type name of the black ink loaded in the printer 3 and "CI-B Black Ink" as the value (Retrieve(Value)) is returned.

FIG. 20 shows the content of XML Device Description in a UPnP device supported by the PC 2. Referring to FIG. 20, leftmost numbers denote line numbers. The second to seventeenth lines indicate a "root" element describing that the PC 2 is compliant with a device standardized by the UPnP Forum. The seventh to sixteenth lines indicate a "device" element. The eighth line indicates a "deviceType" element describing that the PC 2 is a device compliant with Basic Device V1.0 standardized by the UPnP Forum. The ninth line indicates a "friendlyName" element. The tenth line indicates a "manufacturer" element describing a manufacturer name. The eleventh line indicates a "manufacturerURL" element describing the URL of the home page of a Web site of the manufacturer. The twelfth line indicates a "modelDescription" element describing the identification name of an end user. The thirteenth line indicates a "modelName" element describing a model name. The fourteenth line indicates a "serialNumber" element describing a serial number. The fifteenth line indicates a "languageID" element describing the language ID of a language used in the OS of the PC 2. The character string (char*) resulting from conversion of the language ID (unsigned short type) acquired by the OS of the PC 2 by calling the API function "GetSystemDefaultLangID( )" used in the Windows™ XP is actually described in the fifteenth line. This language ID is newly proposed because it is not implemented in the current Windows™ XP.

The OS of the PC 1 can use the "languageID" element in FIG. 20 to acquire the language ID used in the PCs 2 and 40, so that the OS of the PC 1 can confirm the language ID from the "languageID" element in Step S2903 in FIG. 29, instead of confirming the language ID from the schema. In this case, it is not necessary to use the schema including the language ID, as shown in FIG. 15, and it is sufficient to use a simple schema that does not include the language ID, as shown in FIG. 34.

FIG. 24 shows data when the PC 1 acquires ink information from the printer 3. Although the data actually communicated between the PC 1 and the printer 3 is binary data, the data is represented as text data after being encoded in a Shift JIS code for clarity in FIG. 24.

FIG. 24 shows a case in which the printer 3 stores the name of ink localized into each language and in which the printer 3 has the data in Japanese and US English as the data concerning the names of ink. Referring to FIG. 24, when the PC 1 issues a request command to the printer 3 through the USB interface 9, the ink information is returned from the printer 3 to the PC 1 through the USB interface 9. The ink information has the following content.

| <Color> | <Type name> | <Name (Japanese)> | <Name (US English)> | <State> |
|---|---|---|---|---|
| Black | CI-B | CI-B 黒インク | CI-B Black Ink | Full |
| Cyan | CI-C | CI-C シアンインク | CI-C Cyan Ink | Low |
| Magenta | CI-M | CI-M マゼンタインク | CI-M Magenta Ink | Out |
| Yellow | CI-Y | CT-Y 黄インク | CI-Y Yellow Ink | Full |

Although examples in which the character strings of the names of ink localized into each language are stored in the LM resource 6 are shown in the first and second embodiments, the present invention is not limited to these examples. The character strings of the names of ink corresponding to all the languages may be stored in the printer 3.

As described above, the character strings of the names of ink localized into each language are stored in an application resource manufactured by the MMN company in related art, whereas the character strings of the names of ink localized into each language are stored in the LM resource 6 manufactured by the XYZ company to display the accurate names of ink in the ink-information display area 47 in the application 30 and in the ink-information display area 52 in the application 41 in the second embodiment.

The storage structure of data processing programs capable of being read out by the peripheral-device control system including the information processing apparatus and the peripheral device, according to the second embodiment, will be described next with reference to memory maps shown in FIG. 37.

Figure 37:
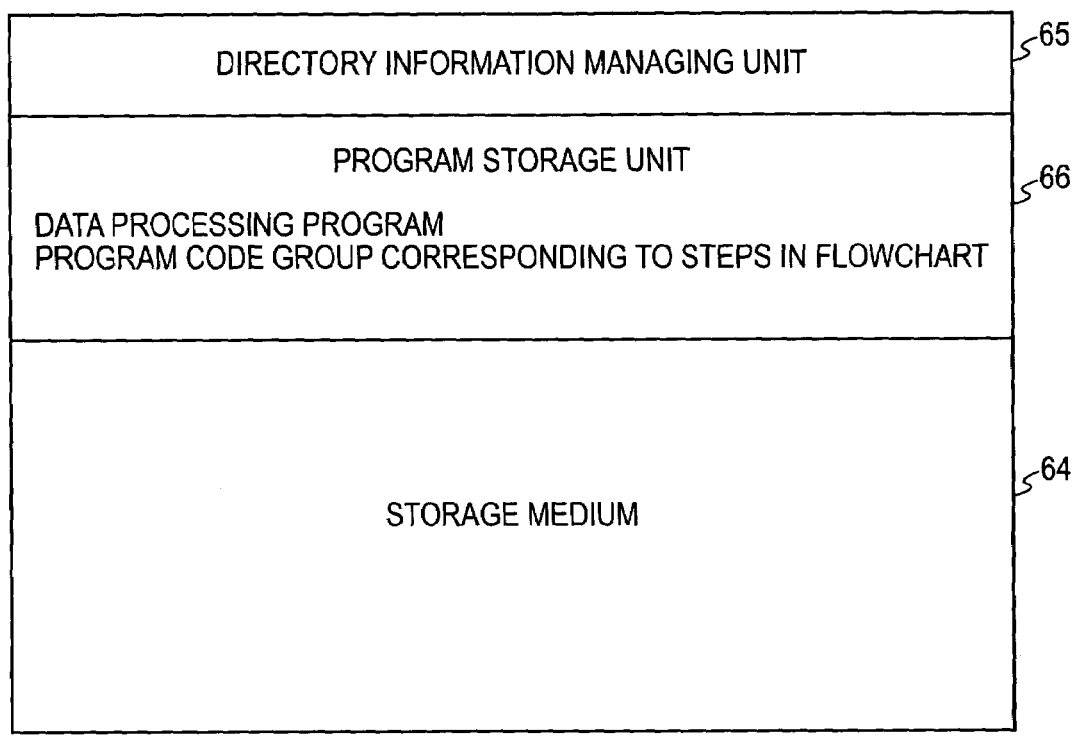
FIG. 37 illustrates a memory map of a storage medium storing various data processing programs capable of being read out by the peripheral-device control system.

FIG. 37 illustrates a memory map of a storage medium storing various data processing programs capable of being read out by the peripheral-device control system according to the second embodiment. Although not shown in FIG. 37, information used for managing a program group stored in the storage medium, for example, version information and creators of the programs, may be stored in the storage medium. In addition, information depending on the OS of the PC that reads the programs, for example, the information concerning icons identifying and displaying the programs, may be stored in the storage medium.

Referring to FIG. 37, a storage medium 64 is a hard disk. A directory information managing unit 65 manages the data belonging to various programs. A program storage unit 66 stores programs used for installing the various programs in an information processing apparatus. When the programs to be installed are compressed, a decompression program may be stored in the program storage unit 66.

The functions realized by performing the flowcharts shown in FIGS. 26, 27, 28, and 29, according to the above embodiments, may be realized by the information processing apparatus with programs externally installed. In such a case, the present invention also applies to cases in which a group of information including programs is supplied to the information processing apparatus and the peripheral device from a storage medium, such as a CD-ROM, a flash memory, or a flexible disk, or from an external storage medium over a network.

As described above, according to the above embodiments, when a third party, such as the MMN company, develops an application (status monitor) for a printer manufactured by the XYZ company and distributes (sells) the application (status monitor) for the printer to a user, for example, storing the character strings of the names of ink localized into each language in an LM resource manufactured by the XYZ company allows the ink information including the correct names of ink defined by the XYZ company to be accurately displayed on the screen of the application. Such display prevents the user from being confused in the loading or purchasing the ink to suppress operations errors or improper purchase. In addition, the usability of the user is improved.

Newly defining the "LoadLibraryForMultiLanguage( )" function shown in FIG. 18 makes implementation of the language monitor easy.

Furthermore, since the spooler creates the print thread having the attribute of the language ID and calls the "SendRecv-BidiDataFromPort( )" function in the language monitor in this thread, it is not necessary to perform a special process, such as switching of processing in accordance with the language ID, in the language monitor, thus simplifying the implementation.

Third Embodiment

A third embodiment of the present invention will be described below.

Figure 2:
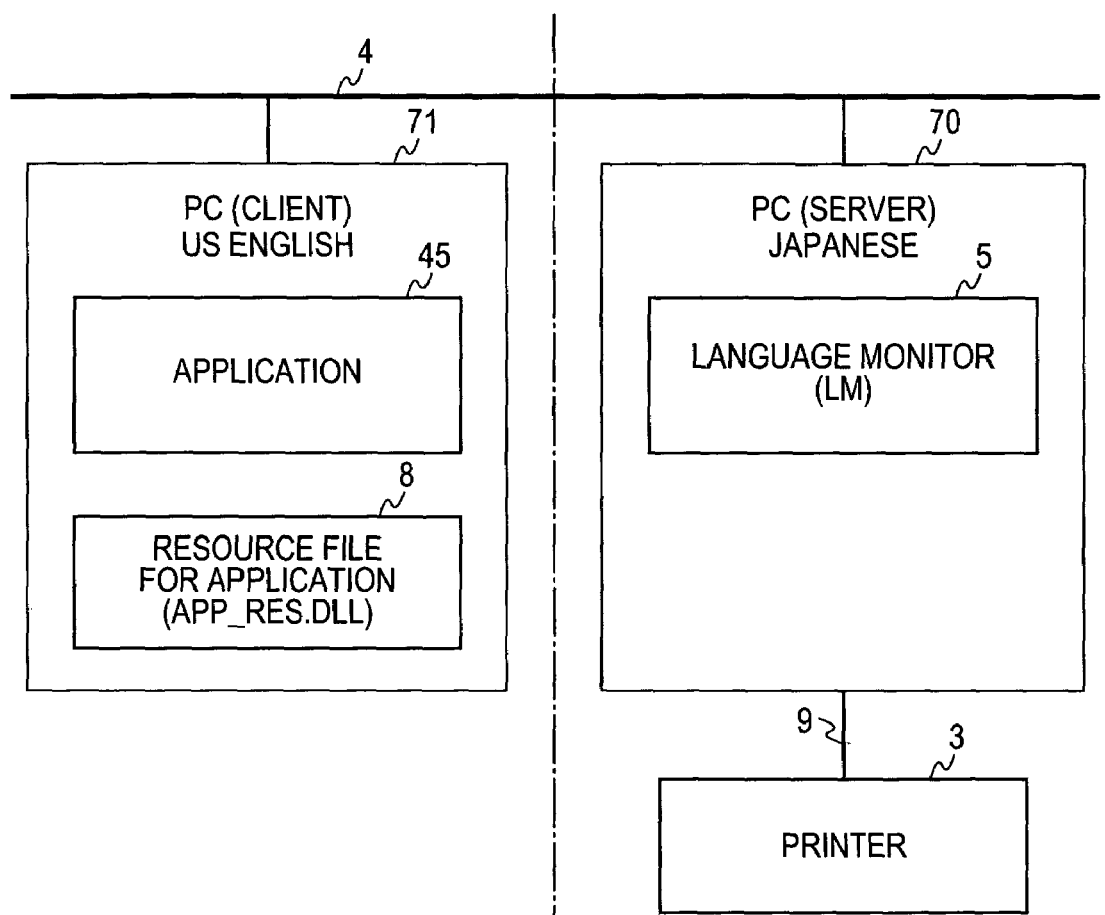
FIG. 2 is a block diagram showing the structure of a peripheral-device control system including an information processing apparatus and a peripheral device, according to a third embodiment of the present invention.

FIG. 2 is a block diagram showing the structure of a peripheral-device control system including an information processing apparatus and a peripheral device, according to a third embodiment of the present invention. Referring to FIG. 2, information processing apparatuses 70 and 71 are common personal computers (each of them being abbreviated as the PC in some cases). The PCs 70 and 71 each have the hardware structure shown in FIG. 3 and each have Windows™ XP of Microsoft U.S. installed as the operating system (OS). The PC 70 is connected to the PC 71 via a network 4, which is Ethernet™, and the PC 70 is capable of two-way communication with the PC 71. A printer 3, which is a color inkjet printer, is an example of a peripheral device. The printer 3 has a model name kmmn and is manufactured by XYZ company. The peripheral device applicable to the present invention is, for example, an image forming apparatus, such as a printer, a copier, a facsimile, or a digital multifunction machine having the functions of the above-mentioned devices, a scanner, or a digital camera.

The printer 3 has the hardware structure shown in FIG. 4. The printer 3 is connected to the PC 70 via a USB interface 9 and the printer 3 is capable of the two-way communication with the PC 70. A language monitor 5 (hereinafter referred to as the LM 5 in some cases) is a dynamic link library for Windows™. An application 45 includes executable files (*.exe) for Windows™. The application 45 is a status monitor described below with reference to FIG. 6. The application (status monitor) 45 is manufactured by MMN company.

A resource file 8 for an application (hereinafter referred to as the application resource 8 in some cases) is a dynamic link library for Windows™ and stores character string resources and so on. In the peripheral-device control system according to the third embodiment, the PC 70 serves as a server and the PC 71 serves as a client. The PC 70 has a function of a print server with which printing can be performed from another information processing apparatus via the network 4 by using the printer 3 as a shared printer. It is assumed that the PC 70 has Japanese Windows™ XP installed and the PC 71 has US English Windows™ XP installed. The PC 71 transmits data (information) to the LM 5 in the PC 70 through the printing and print spooler interfaces disclosed in the site of the MSDN, described above, and/or receives data (information) from the LM 5. Since this transmission-reception function is a known function of the Windows™ XP, a detailed description of the function is omitted here.

Figure 6:
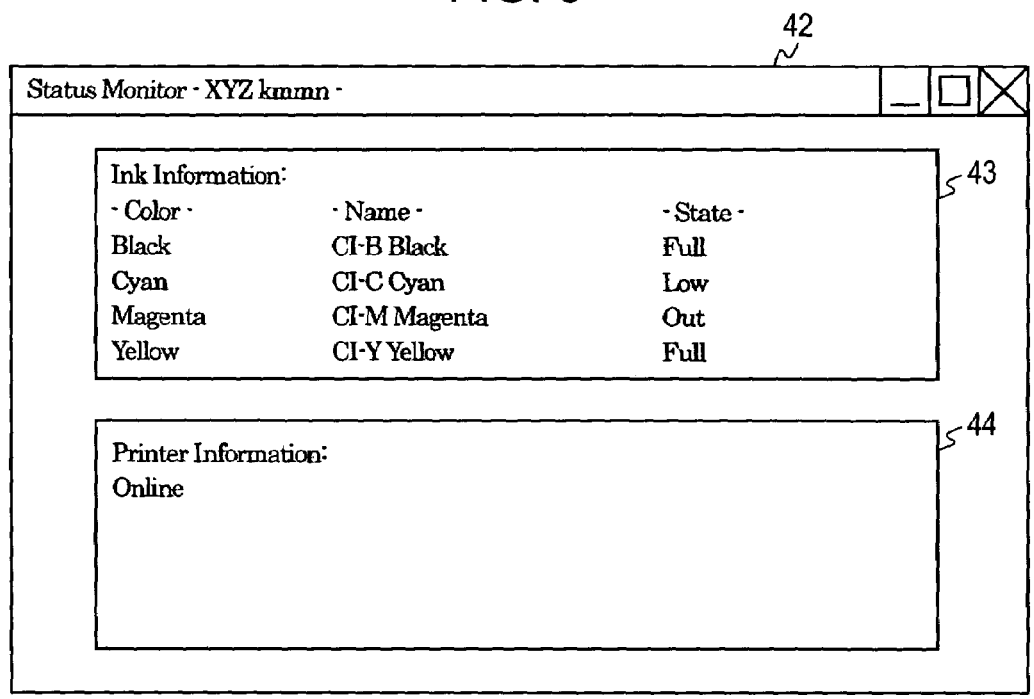
FIG. 6 shows a status monitor monitoring the status of the printer in a US English OS environment, according to the third embodiment.

FIG. 6 shows a status monitor monitoring the status of a printer in a US English OS environment. The status monitor in FIG. 6 corresponds to the application 45 installed in the PC 71. Since the US English Windows™ XP is installed in the PC 71, the US English display is provided on the screen of the PC 71. Referring to FIG. 6, the current state of the printer 3 (having the model name kmmn and being manufactured by the XYZ company) is displayed in a main window 42 of the status monitor. The states of ink loaded in the printer 3 are displayed in an ink-information display area 43. As shown in FIG. 6, the printer 3 loads four colors of ink; black (Black), cyan (Cyan), magenta (Magenta), and yellow (Yellow). The "Name" (name) of the black ink is "CI-B Black", the "Name" (name) of the cyan ink is "I-C Cyan", the "Name" (name) of the magenta ink is "I-M Magenta", and the "Name" (name) of the yellow ink is "CI-Y Yellow". The black ink is in a state "Full" (full), the cyan ink is in a state "Low" (a low amount of ink remains), the magenta ink is in a state "Out" (no amount of ink remains), and the yellow ink is in the state "Full" (full). The fact that the printer is in an "Online" (online) state is displayed in a printer-information display area 44.

Figure 7:
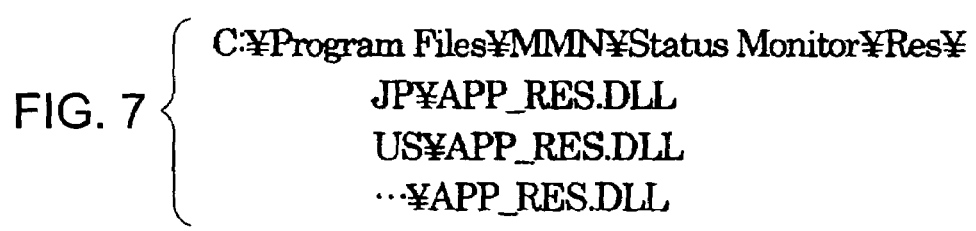
FIG. 7 illustrates a storage folder and the state of storage of an application resource, according to the third embodiment.

FIG. 7 illustrates a storage folder and the state of storage of the application resource 8. An example in which the Windows™ XP is installed in the "C:\" drive of the PC 71 and the application (status monitor) 45 is installed in "C:\Program Files\MMN\Status Monitor\" is shown in FIG. 7. The application resource 8 is the dynamic link library for Windows™ and corresponds to "APP_RES.DLL" files. Since the application resource 8 is a driver ready for multiple languages, the application resource 8 includes the character string resources for all the supported languages. The character string resources for the languages are stored in folders provided for every language in the same file name ("APP_RES.DLL"), as shown in FIG. 7. For example, the application resource 8 for Japanese is stored in a JP folder in "C:\Program Files\MMN\Status Monitor\Res\" and the application resource 8 for US English is stored in a US folder therein.

FIG. 11 shows schemas used when the application (status monitor) 45 acquires the information concerning the ink and the states of the ink from the printer 3. The schemas are specified as arguments in the call of the API function "IBidiSpl::SendRecv( )" of the COM interface "IBidiSpl" used in the Windows™ XP when the application 45 acquires the information concerning the ink and the states of the ink from the printer 3 through the LM 36 and the printing and print spooler interfaces.

Referring to FIG. 11, "InkInfo" has a node type "Property" and indicates information concerning ink. The full path to the "InkInfo" in the schema is "\Printer.InkInfo". "[Color]" has the node type "Property" and indicates information concerning color. The full path to the "[Color]" in the schema is "\Printer.InkInf[Color]". Allowed values are "Black" indicating black, "Cyan" indicating cyan, "Magenta" indicating magenta, and "Yellow" indicating yellow. If the information concerning the black ink is to be acquired, "\Printer.InkInfo.Black" is specified. "Installed" has a node type "Value" and a data type "Boolean", and indicates whether the [Color] ink is loaded. The full path to the "Installed" in the schema is "\Printer.InkInfo[Color]:Installed". Allowed values are "True" indicating that the [Color] ink is loaded and "False" indicating that the [Color] ink is not loaded. "State" has the node type "Value" and a data type "String", and indicates the state of the remaining amount of the [Color] ink. The full path to the "State" in the schema is "\Printer.InkInfo[Color]:

State". Allowed values are "Full" indicating that the [Color] ink is full, "Low" indicating that the remaining amount of the [Color] ink is low, "Out" indicating that the [Color] ink is out, and "Unknown" indicating that the remaining amount of the [Color] ink is unknown. "ModelName" has the node type "Value" and a data type "String", and indicates the type name of the [Color] ink. The full path to the "ModelName" in the schema is "\Printer.InkInfo[Color]:ModelName". Allowed values are ASCII character strings shown in "Examples" in FIG. 11. The node type "Value" of the "Installed", "State", and "ModelName" is a value returned from the LM 5 or the printer 3 to the application 45. In this manner, the application (status monitor) 45 acquires the information concerning the ink loaded in the printer 3 and the states of the ink by using the schemas defined in FIG. 11.

Figure 12:
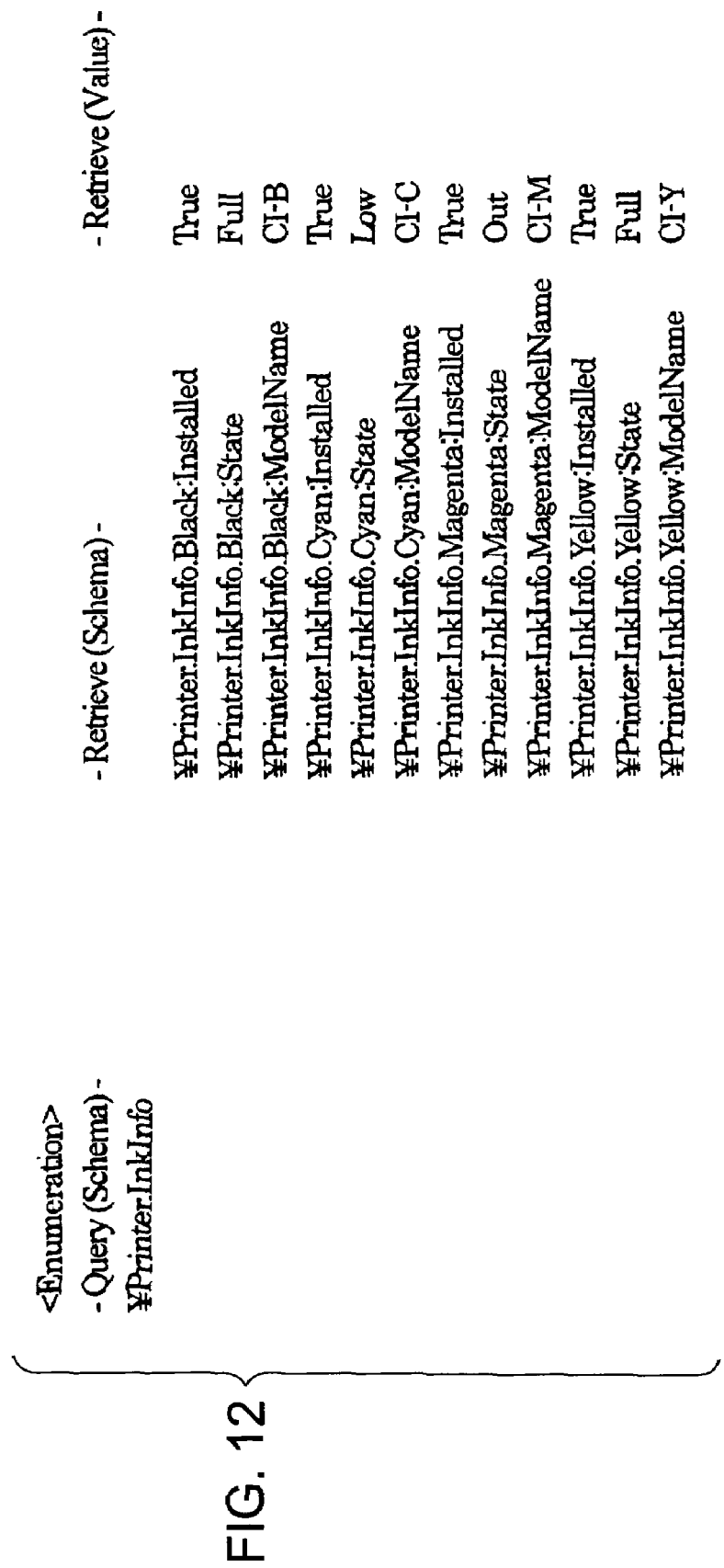
FIG. 12 shows schemas and values when the schemas defined in FIG. 11 are used to enumerate the information and states of ink, according to the third embodiment.

FIG. 12 shows schemas and values when the schemas defined in FIG. 11 are used to enumerate the information and states of ink. Referring to FIG. 12, when the application (status monitor) 45 specifies the "\Printer.InkInfo" schema to call the "IBidiSpl::SendRecv( )" function (Query(Schema) column), sets of schemas (Retrieve(Schema)) describing the information and states of the ink of all the colors loaded in the printer 3 and values (Retrieve(Value)) are returned. In the example in FIG. 12, the black, cyan, magenta, and yellow ink is loaded in the printer 3, and the respective states of the remaining amount of the ink are the "Full" indicating that the ink is full, the "Low" indicating that the remaining amount of the ink is low, the "Out" indicating that the ink is out, and the "Full" indicating that the ink is full. The type names of the black, cyan, magenta, and yellow ink are "CI-B", "CI-C", "CI-M", and "CI-Y", respectively.

Figure 13:
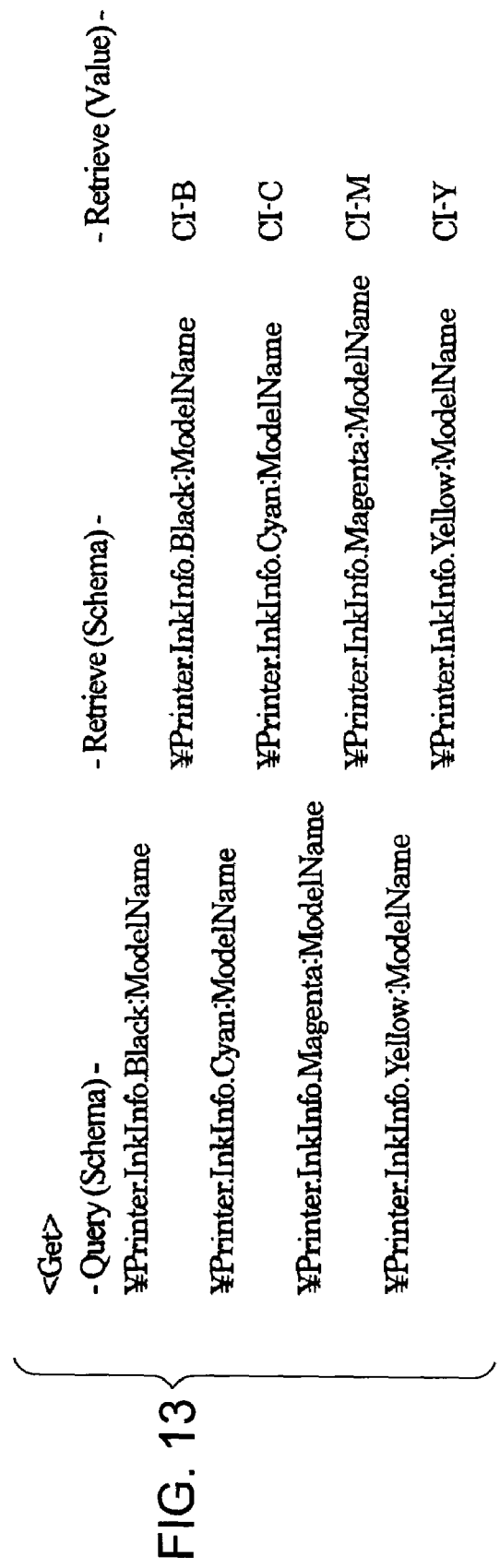
FIG. 13 shows schemas and values when the schemas defined in FIG. 11 are used to get the type names of ink, according to the third embodiment.

FIG. 13 shows schemas and values when the schemas defined in FIG. 11 are used to get the type names of ink. Referring to FIG. 13, for example, in order to acquire the type name of black ink, when the application (status monitor) 45 specifies a schema "\Printer.InkInfo.Black:ModelName" to call the "IBidiSpl::SendRecv( )" function (Query(Schema) column), a set of "\Printer.InkInfo.Black:ModelName" as the schema (Retrieve(Schema)) describing the type name of the black ink loaded in the printer 3 and "CI-B" as the value (Retrieve(Value)) is returned.

FIGS. 21A and 21B are tables of IDs and character strings in the application resource 8. In the application resource 8 for US English shown in FIG. 21A, "CI-B Black", "CI-C Cyan", "CI-M Magenta", and "CI-Y Yellow" are mapped to "ID1", "ID2", "ID3", and "ID4", respectively. In the application resource 8 for Japanese shown in FIG. 21B, "CI-B (黒(kuro)),(kuro)", "CI-C シアン (sian)", "CI-M マゼンタ (mazenta)", and "CI-Y 黄 (ki)" are mapped to "ID1", "ID2", "ID3", and "ID4", respectively. Although these are the names of ink for the printer 3, manufactured by the XYZ company, these names are defined by the MMN company, which has no relationship with the XYZ company manufacturing the printer 3, and are different from those defined by the XYZ company, shown in FIGS. 22A and 22B.

Figure 25:
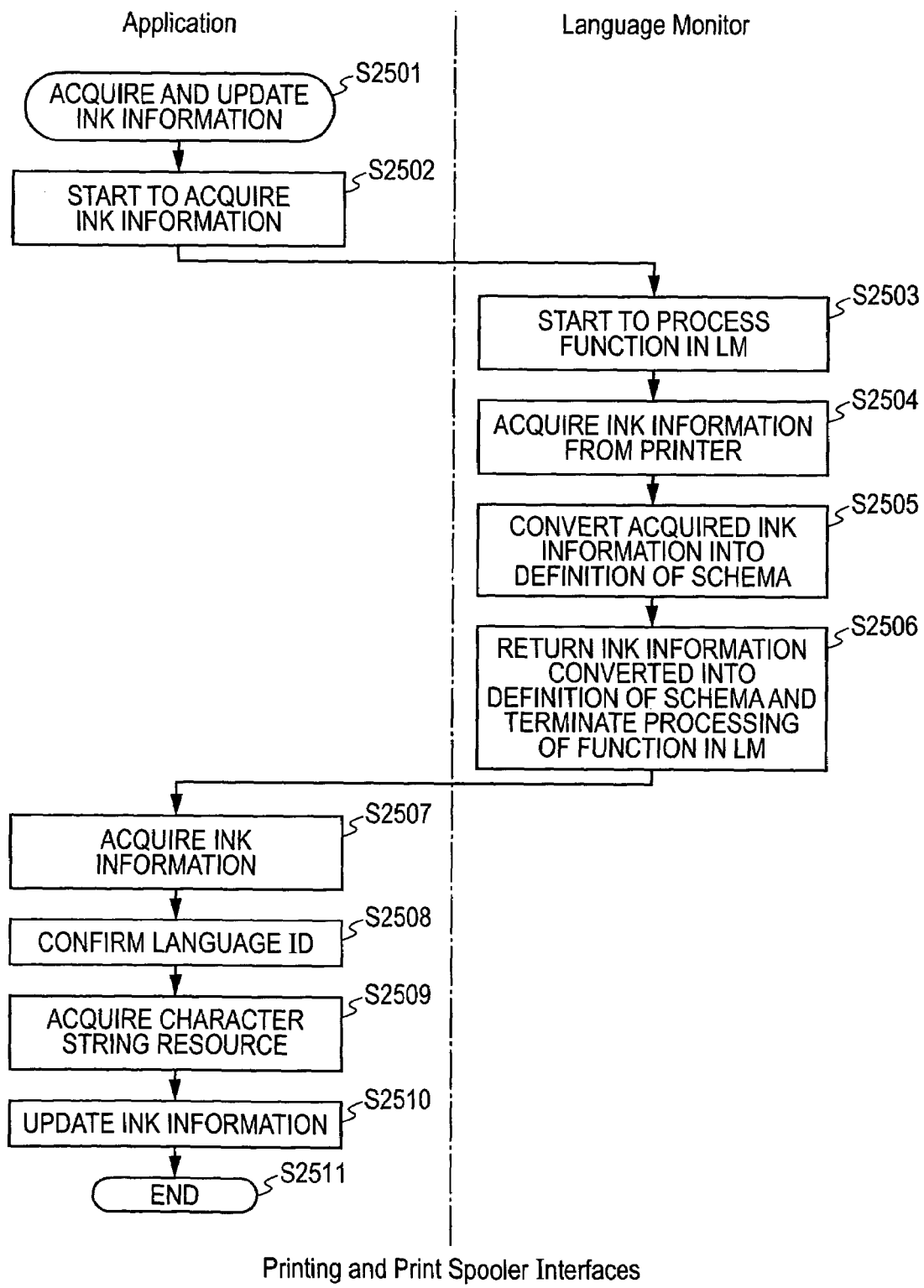
FIG. 25 is a flowchart showing a process in which the application (status monitor) acquires information concerning the ink loaded in the printer to update the display in an ink-information display area in FIG. 6, according to the third embodiment.

The operation of the peripheral-device control system according to the third embodiment will be described next with reference to flowchart shown in FIG. 25. FIG. 25 is a flowchart showing a process in which the application (status monitor) 45 acquires information concerning the ink loaded in the printer 3 to update the display in the ink-information display area 43 in FIG. 6.

Referring to FIG. 25, in Step S2501, the application 45 starts to acquire the information concerning the ink loaded in the printer 3 to update the display in the ink-information display area 43. In Step S2502, the application 45 calls the API function "IBidiSpl::SendRecv( )" of the COM interface "IBidiSpl" by using the "\Printer.InkInfo" schema, defined in FIG. 11, as the argument to start to acquire the ink information. In Step S2503, a spooler (since the spooler is part of the known function of the Windows™ XP, a detailed description and drawing is omitted) in the PC 70 calls the "SendRecvBidiDataFromPort( )" function exported by the LM 5 through the printing and print spooler interfaces to start the processing in this function.

The PC 70 issues a request command in the "SendRecvBidiDataFromPort( )" function in the LM 5, as shown in FIG. 23, and, in Step S2504, the PC 70 acquires the ink information returned from the printer 3. In Step S2505, the PC 70 converts the acquired ink information in accordance with the definition in the "\Printer.InkInfo" schema, specified as an argument of the "SendRecvBidiDataFromPort( )" function. In Step S2506, the PC 70 returns the ink information converted into the definition of the schema in FIG. 12 as an argument of the "SendRecvBidiDataFromPort( )" function and terminates the processing by the "SendRecvBidiDataFromPort( )" function in the LM 5.

In Step S2507, the application 45 receives the returned "IBidiSpl::SendRecv( )" function and acquires the ink information returned as an argument in the definition of schema in FIG. 12. In Step S2508, the application 45 calls the API function "GetUserDefaultLangID( )" used in the Windows™ XP to confirm a language ID (unsigned short type). Since the US English Windows™ XP is installed in the PC 71, the PC 71 determines in Step S2508 that the language ID is "1033" indicating the language ID of US English. In Step S2509, the application 45 acquires the character string resource from the application resource 8 loaded with the API function "LoadLibrary( )" used in the Windows™ XP, by using the table of the IDs and the character strings, as shown in FIG. 21A, based on the language ID. In Step S2510, the application 45 uses the character string resource to update the display in the ink-information display area 43 in FIG. 6. In Step S2511, the application 45 terminates the process of acquiring the information of the ink loaded in the printer 3 to update the display in the ink-information display area 43.

The application 45 normally repeats the process of acquiring the information concerning the ink loaded in the printer 3 to update the display in the ink-information display area 43, started from Step S2501, at predetermined intervals, for example, once for every five seconds, to display the information and the states of the ink loaded in the printer 3 in the ink-information display area 43 in real time. When the "Name" (name) in the ink-information display area 43 is to be updated in Step S2510, the application 45 acquires the ink information from the value returned as "ModelName" ("\Printer.InkInfo[Color]:ModelName") in the schemas, defined in FIG. 11, in Step S2507, determines the ID (ID1, ID2, ID3, or ID4), shown in FIG. 21A or 21B, of the character string representing the name of the corresponding ink to acquire the character string mapped to the ID, in Step S2509, and updates the information in the ink-information display area 43 by using the character string in Step S2510.

FIG. 30 shows a sample program of a series of processes of determining the language ID in the application (status monitor) 45 to acquire the character string resource. As shown in comments in FIG. 30, the sample program is an example of the program for implementing the processes corresponding to some of the steps in FIG. 25. Since the processes are the API functions or the standard functions in the C language used in the Windows™ XP, a description is omitted herein.

The present invention can be embodied by supplying a storage medium having the program code of software realizing the functions according to the above embodiments to a system or an apparatus, a computer (or the CPU or the micro processing unit (MPU)) in which system or apparatus reads out and executes the program code stored in the storage medium.

In this case, the program code itself read out from the storage medium realizes the functions of the embodiments described above. The present invention is applicable to the program code and the storage medium having the program code stored therein.

The storage medium supplying the program code is, for example, a flexible disk, a hard disk, an optical disk, a magneto-optical disk, a CD-ROM, a compact disc recordable (CD-R), a magnetic disk, a nonvolatile memory card, or an ROM.

The computer that executes the readout program code realizes the functions of the embodiments described above. In addition, the OS (the basic system or the operating system) or the like running on the computer may execute all or part of the actual processing based on instructions in the program code to realize the functions of the embodiments described above.

Alternatively, after the program code read out from the storage medium has been written in a memory that is provided in an expansion board included in the computer or in an expansion unit connected to the computer, the CPU or the like in the expansion board or the expansion unit may execute all or part of the actual processing based on instructions in the program code to realize the functions of the embodiments described above.

Although the application 30 is exemplified by the status monitor in the embodiments of the present invention, the present invention is not limited to this example. The application 30 may be any application as long as it acquires information from the peripheral device to use the acquired information.

Although the application (status monitor) 30 monitors the information and states of the ink loaded in the printer 3 in the embodiments of the present invention, the present invention is not limited to this case. The application (status monitor) 30 may acquire any information and state, including the operation state of the peripheral device, a warning, the state of an error, and/or the installation state of an option.

Although the peripheral-device control system is realized by using the UPnP, as shown in FIG. 20, in the embodiments of the present invention, the peripheral-device control system may be realized by using a protocol having a similar function. Use of standardized specifications allows a more general-purpose system to be easily realized.

Although the printer 3 is exemplified by a color inkjet printer in the embodiments of the present invention, the present invention is not limited to this example. For example, any printer, such as a monochrome laser beam printer (LBP), may be used as the printer 3.

Although the personal computers are presumed as the client and the server in the embodiments of the present invention, the present invention is not limited to this example. The present invention can be realized by using any terminal, such as a DVD video player, a PC game, a set-top box, or an Internet appliance, which is capable of being used in a similar manner.

Although the peripheral device is exemplified by the printer in the embodiments of the present invention, a copier, a facsimile, a scanner, a digital camera, and an apparatus having the functions of the above-mentioned devices are applicable to the peripheral device.

Although the Windows™ XP is used as the OS in the embodiments of the present invention, the OS is not limited to the Windows™ XP and any OS may be used.

Although the Ethernet™ is used as the network 4 in the embodiments of the present invention, the present invention is not limited to this example. The network 4 may be another network.

Although the USB interface is used as the interface between the PC 1 and the printer 3 in the embodiments of the present invention, the present invention is not limited to this interface. For example, any interface, such as the Ethernet™ interface, a wireless LAN interface, an IEEE1394 interface, an Infrared Data Association (IrDA) interface, a parallel interface, or a serial interface, may be used.

Although the example in which the application 30 on the PC 2 (client) connected via the network 4 acquires the information concerning the ink loaded in the printer 3 via the PC 1 (server) is described in the embodiments of the present invention, the present invention is not limited to this example. For example, even when the OS of the PC 1 supports multiple users, each user can arbitrarily set the language to be used, and the language that is to be used and that is set by the user (for example, the US English) is different from the language (for example, Japanese) set in the OS, the application on the PC 2 can acquire the information of the ink loaded in the printer via the language monitor and the printing and print spooler interfaces. Accordingly, the present invention can also be realized and effective in an environment that is locally connected, such as a USB interface, and that is not via the network.

According to the present invention, the information concerning an external device is converted into the information adapted to a display program provided in each information processing apparatus based on the information concerning the display program and the converted information is supplied to the information processing apparatus. Accordingly, even when the manufacturer of the external device is different from that of the display program, it is possible to accurately display the information concerning the external device (for example, device information including the name of the ink loaded in the printer, etc.) by using the information adapted to the display program (for example, the language information used by the application or the information defined by the manufacturer of the printer).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-249039 filed Aug. 27, 2004, which is hereby incorporated by reference herein in its entirety.

What is claimed is:

1. An information processing apparatus that is connectable to an external device via a communication network and that supplies information concerning the external device, the information concerning the external device being displayable in accordance with a plurality of expressions, the information processing apparatus comprising:

an acquiring unit configured to acquire information concerning a display program, the information concerning the display program being used for identifying at least one of the expressions to be displayed in the display program;

a receiving unit configured to receive the information concerning the external device from the external device; and a generating unit configured to identify the expression of the information concerning the external device, received by the receiving unit, based on the information concerning the display program, acquired by the acquiring unit, in order to generate display information complying with the identified expression.

2. The information processing apparatus according to claim 1, further comprising a transmission unit configured to transmit the display information generated by the generating unit to another information processing apparatus.

3. The information processing apparatus according to claim 1, further comprising a storage unit configured to store information concerning a plurality of display programs used for identifying one expression to be displayed in the plurality of display programs,
wherein the generating unit generates the display information from the information concerning the external device based on the information concerning the display programs.

4. The information processing apparatus according to claim 3,
wherein the information concerning the display programs is language-attribute identifying information used for identifying language attributes of the display programs,
wherein the storage unit stores the information concerning the display programs for every language attribute, and
wherein the generating unit generates the display information from the information concerning the external device based on the information concerning the display programs, corresponding to the language-attribute identifying information.

5. The information processing apparatus according to claim 4,
wherein the generating unit generates the display information from the information concerning the external device by using information used in generation processes corresponding to language attributes similar to the language attributes identified in the language-attribute identifying information when the storage unit does not have the information concerning the display programs, the information having the language attributes identified in the language-attribute identifying information.

6. The information processing apparatus according to claim 1,
wherein the information concerning the display program varies for every supplier of the display program, and
wherein the generating unit generates the display information from the information concerning the external device based on the display program.

7. An information processing apparatus connectable to an external device via a communication network, the information processing apparatus comprising:
a receiving unit configured to receive information concerning a display program set in another information processing apparatus from the other information processing apparatus;
a thread generating unit configured to generate a thread that is used for controlling the external device and that corresponds to the information concerning the display program based on the information concerning the display program;
an acquiring unit configured to acquire information concerning the external device from the external device;
a converting unit configured to convert the information concerning the external device, acquired by the acquiring unit, into information appropriate for the display program based on the thread generated by the thread generating unit; and
a transmission unit configured to transmit the information concerning the external device, converted by the converting unit, to the other information processing apparatus.

8. A control method for an information processing apparatus that is connectable to an external device via a communication network and that supplies information concerning the external device, the information being displayable in accordance with a plurality of expressions, the control method comprising the steps of:
acquiring information concerning a display program, the information concerning the display program being used for identifying at least one of the plurality of expressions adoptable in the information concerning the external device;
receiving the information concerning the external device from the external device; and
identifying the expression of the information concerning the external device, received in the receiving step, based on the information concerning the display program, acquired in the acquiring step, to generate display information complying with the identified expression.

9. The control method for the information processing apparatus according to claim 8, further comprising a step of transmitting the generated display information to another information processing apparatus.

10. The control method for the information processing apparatus according to claim 8, further comprising a step of storing information concerning a plurality of display programs, used for identifying one expression to be displayed in the plurality of display programs,
wherein the display information is generated from the information concerning the external device based on the information concerning the display programs.

11. The control method for the information processing apparatus according to claim 10,
wherein the information concerning the display programs is language-attribute identifying information used for identifying language attributes of the display programs,
wherein the information concerning the display programs is stored for every language attribute in the storing step, and
wherein the display information is generated from the information concerning the external device based on the information concerning the display programs, corresponding to the language-attribute identifying information.

12. The control method for the information processing apparatus according to claim 11,
wherein the display information is generated from the information concerning the external device by using information used in generation processes corresponding to language attributes similar to the language attributes identified in the language-attribute identifying information when the information concerning the display programs, the information having the language attributes identified in the language-attribute identifying information, does not exist in the storing step.

13. The control method for the information processing apparatus according to claim 8,
wherein the information concerning the display program varies for every supplier of the display program, and wherein the display information is generated from the information concerning the external device based on the display program.

14. A control method for an information processing apparatus connectable to an external device via a communication network, the control method comprising the steps of:
    receiving information concerning a display program set in another information processing apparatus from the other information processing apparatus;
    generating a thread that is used for controlling the external device and that corresponds to the information concerning the display program;
    acquiring information concerning the external device from the external device;
    converting the information concerning the external device, acquired in the acquiring step, into information appropriate for the display program based on the thread generated in the generating step; and
    transmitting the information concerning the external device, converted in the converting step, to the other information processing apparatus.

15. An information processing apparatus that communicates with an external device, information concerning the external device being displayable in accordance with a plurality of expressions, the information processing apparatus comprising:
    an acquiring unit configured to acquire information concerning a display program, the information concerning the display program being used for identifying at least one of the expressions to be displayed in the display program;
    an obtaining unit configured to obtain device information from the external device; and
    a unit configured to identify the expression of the device information obtained by the obtaining unit based on the information concerning the display program.

16. A method for controlling an information processing apparatus that communicates with an external device, information concerning the external device being displayable in accordance with a plurality of expressions, the method comprising:
    an acquiring step of acquiring information concerning a display program, the information concerning the display program being used for identifying at least one of the expressions to be displayed in the display program;
    an obtaining step of obtaining device information from the external device; and
    a step of identifying the expression of the device information obtained by the obtaining step based on the information concerning the display program.

17. A computer program that controls a computer processor so as to execute a method for controlling an information processing apparatus communicating with an external device, information concerning the external device being displayable in accordance with a plurality of expressions, the method comprising:
    an acquiring step of acquiring information concerning a display program, the information concerning the display program being used for identifying at least one of the expressions to be displayed in the display program;
    an obtaining step of obtaining device information from the external device; and
    a step of identifying the expression of the device information obtained by the obtaining step based on the information concerning the display program.

* * * * *